(12) United States Patent
Chin et al.

(10) Patent No.: US 7,882,918 B2
(45) Date of Patent: Feb. 8, 2011

(54) FOLDING MOTOR SCOOTER

(75) Inventors: Ryan C. Chin, Boston, MA (US);
Raul-David Poblano, Walnut, CA (US);
Michael Chia Liang Lin, Summit, NJ
(US); Arthur Joseph Petron,
Cambridge, MA (US)

(73) Assignee: Massachusetts Institute of Technology,
Cambridge, MA (US)

( * ) Notice: Subject to any disclaimer, the term of this patent is extended or adjusted under 35 U.S.C. 154(b) by 53 days.

(21) Appl. No.: 12/263,737

(22) Filed: Nov. 3, 2008

(65) Prior Publication Data

US 2009/0115167 A1    May 7, 2009

(51) Int. Cl.
*B62D 61/00*    (2006.01)

(52) U.S. Cl. ................... 180/220; 180/65.1; 280/278; 280/287; 280/639

(58) Field of Classification Search ................ 280/639, 280/278, 287; 180/180, 181, 218–220, 65.1, 180/907, 908
See application file for complete search history.

(56) References Cited

U.S. PATENT DOCUMENTS

| | | | | |
|---|---|---|---|---|
| 3,354,975 A | * | 11/1967 | Stuart | 180/208 |
| 4,026,573 A | * | 5/1977 | Richardson | 280/278 |
| 6,302,422 B1 | * | 10/2001 | Liu | 280/287 |
| 6,483,272 B1 | * | 11/2002 | Terada et al. | 320/103 |
| 6,581,492 B1 | * | 6/2003 | Chen | 74/551.3 |
| 6,581,949 B2 | * | 6/2003 | Lopez | 280/278 |
| 6,641,159 B1 | * | 11/2003 | Fan | 280/278 |
| 7,451,848 B2 | * | 11/2008 | Flowers et al. | 180/208 |

* cited by examiner

*Primary Examiner*—J. Allen Shriver, II
*Assistant Examiner*—Erez Gurari
(74) *Attorney, Agent, or Firm*—Gordon E. Nelson

(57) ABSTRACT

An improved electric motor scooter includes: a front frame; a front wheel assembly coupled to the front frame and residing on a surface; a back frame; a back wheel assembly coupled to the back frame and residing on the surface; and a center pivot mechanism coupled to the front frame and the back frame. The center pivot mechanism includes a pivot and a folding axis around which the pivot rotates. The folding axis is not perpendicular to a longitudinal axis of the scooter and is tilted from the longitudinal axis at an angle. A rotation of the pivot in a direction folds the scooter vertically from the surface and moves the back wheel assembly toward the front wheel assembly according to the angle. During the folding, the front wheel assembly and the back wheel assembly each remains on the surface as the pivot rotates.

14 Claims, 26 Drawing Sheets

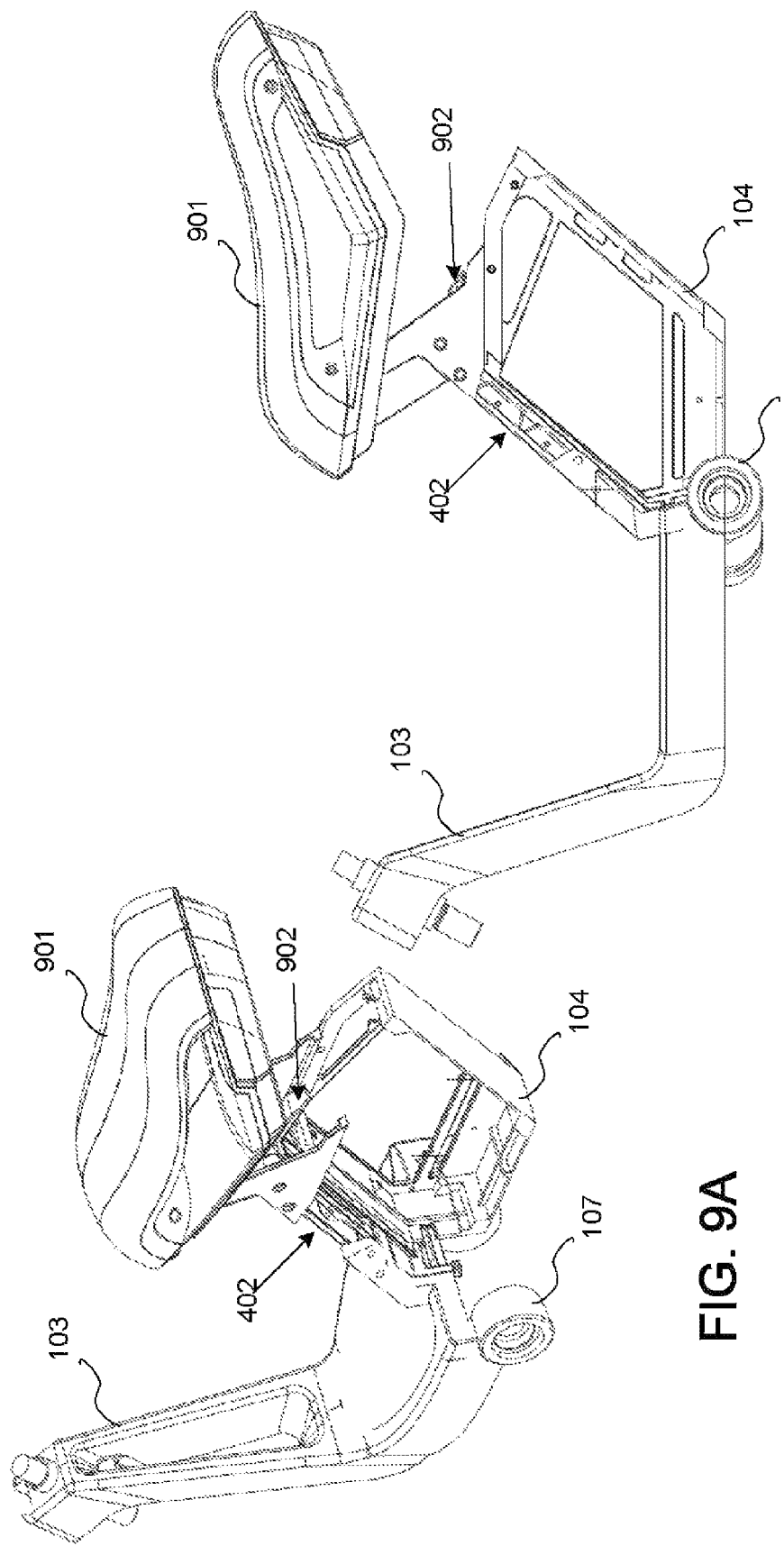

FOLDING MOTOR SCOOTER

CROSS-REFERENCE TO RELATED APPLICATIONS

This application claims priority to Taiwan patent application nos. 963060245 and 96141590, both filed on Nov. 2, 2007.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The invention relates to motor scooters, and more particularly to electric motor scooters that are foldable into a compact form for storage or transport.

2. Description of Related Art

Electric motor scooters are convenient forms of transportation, especially in urban areas. Some conventional scooters can be folded for storage or transport, such as transport onto public buses or trains. Many of these folding scooters, however, employ a center hinge on the frame where one end of the scooter swings toward the other horizontally (i.e., swing in parallel to the ground). This requires the scooter to be folded while dragging or skidding the wheels on the ground. Others require the scooter to be lifted off the ground in order to fold the scooter. Some fold into a position which has a large overall footprint, making it difficult to carry or store. For example, the scooter can fold such that the wheels are not lined up concentrically and in parallel, resulting in a folded scooter with an awkward shape.

Conventional folding scooters, thus, are quite cumbersome to use. Riders who lack sufficient strength, who are handicapped, or who find these scooters to be inconvenient, are otherwise discouraged from using these vehicles.

Accordingly, these exists a need for an improved folding motor scooter which can be folded with minimal friction and which result in wheels that are fully concentric and parallel, thus giving the scooter a small overall footprint.

BRIEF SUMMARY OF THE INVENTION

An improved electric motor scooter includes: a front frame; a front wheel assembly coupled to the front frame and residing on the ground surface; a back frame; a back wheel assembly coupled to the back frame and residing on the surface; and a center pivot mechanism coupled to the front frame and the back frame. The center pivot mechanism includes a pivot and a folding axis around which the pivot rotates. The folding axis is not perpendicular to a longitudinal axis of the scooter and is tilted from the longitudinal axis at an angle. A rotation of the pivot in a direction folds the scooter vertically from the ground surface and moves the back wheel assembly toward the front wheel assembly according to the angle. During the folding, the front wheel assembly and the back wheel assembly each remains on the ground surface as the pivot rotates. The resulting shape of the folded scooter is compact with a minimal footprint, making it easy to store or transport.

The electric motor scooter further includes a seat assembly that includes a four bar linkage coupled to a seat and the front frame. The four bar linkage facilitates moving the seat to a leg resting area of the front frame during the folding of the scooter. Moving the seat to this position adds to the compactness of the scooter in the folded position.

The electric motor scooter further includes a handle bar assembly that folds the handle bars toward the remainder of the scooter, which further adds to the compactness of the scooter in the folded position.

The wheel assembly of the electric motor scooter includes a wheel comprising a hub space, a suspension coupled to the wheel by a four-bar linkage, and a motor coupled to the suspension and the wheel. The motor and the suspension system reside within the hub space. The suspension system (comprising the suspension, the four-bar linkage, and the wheel) being within the space of the wheel hub distributes horizontal loads through the linkage. The four-bar linkage also reduces the unsprung mass. In one embodiment, the wheel assembly is used for both the front and back wheel assemblies, which results in an even weight distribution.

BRIEF DESCRIPTION OF THE SEVERAL VIEWS OF THE DRAWINGS

FIGS. 9A-9G illustrate an alternative seat assembly design for the electric motor scooter.

DETAILED DESCRIPTION OF THE INVENTION

The invention provides an improved folding motor scooter. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Overall Scooter Design

Figure 1A:
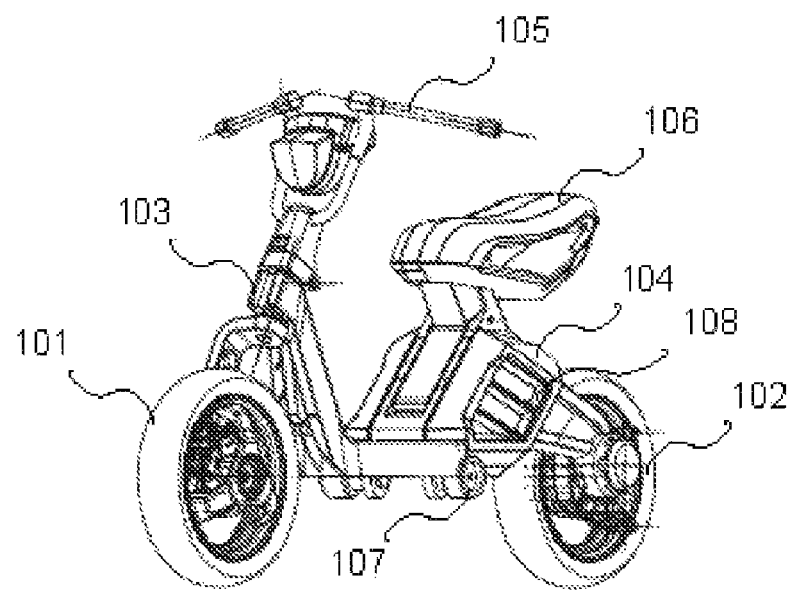
FIGS. 1A-1F illustrate the overall design of the improved folding electric motor scooter in the driving position.
Figure 1B:
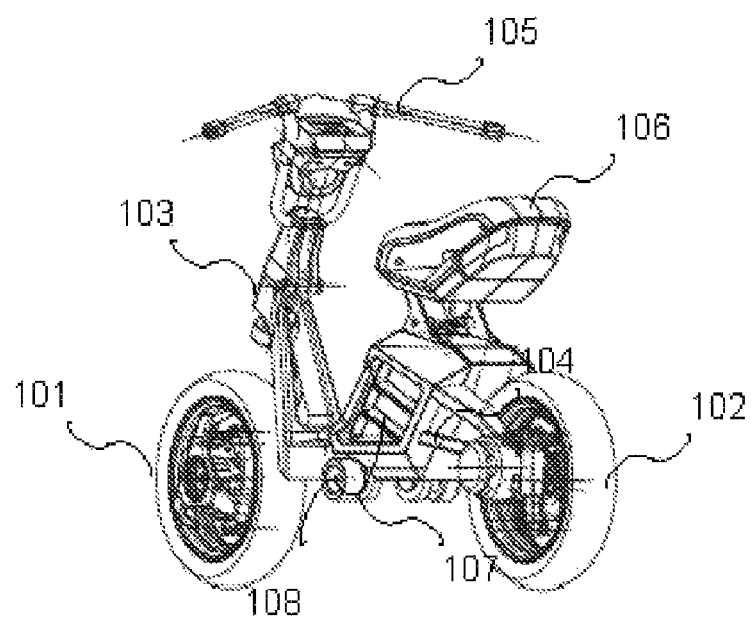
Figure 1C:
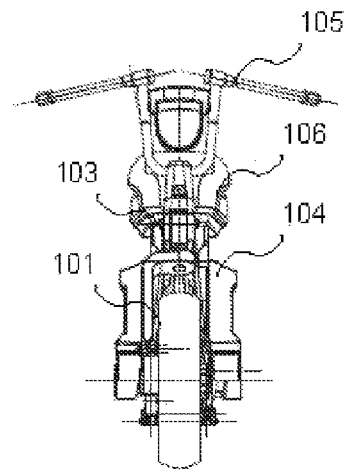
Figure 1D:
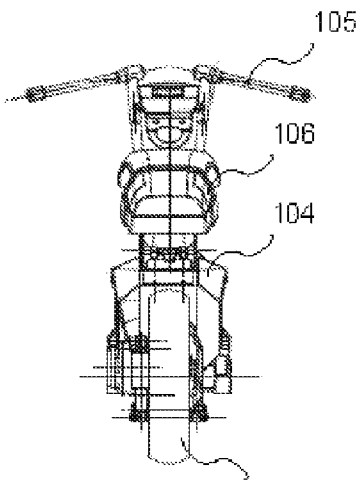
Figure 1E:
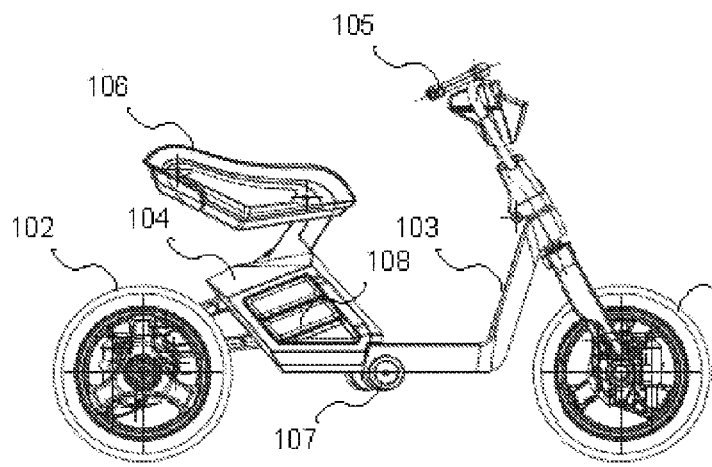
Figure 1F:
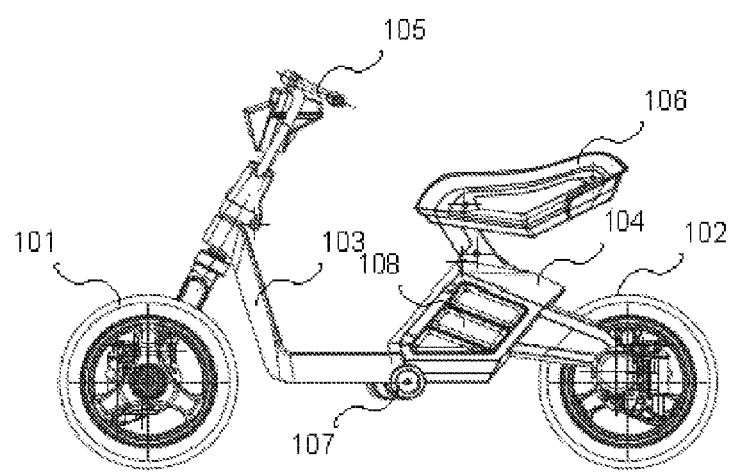

FIGS. 1A-1F illustrate the overall design of the improved folding electric motor scooter in the driving position. FIG. 1A illustrates a front perspective view; FIG. 1B illustrates a back perspective view; FIG. 1C illustrates a front view; FIG. 1D illustrates a back view; FIG. 1E illustrates a right side view; and FIG. 1F illustrates a left side view. As illustrated, the scooter comprises a front wheel assembly 101, a back wheel assembly 102, a front frame 103, a back frame 104, a handle bar assembly 105, a seat assembly 106, a center pivot mechanism 107, and a battery casing 108 within the back frame 104. The front frame 103 and the back frame 104 are coupled at the center pivot mechanism 107. The center pivot mechanism 107 is oriented non-perpendicular to the longitudinal axis of the scooter with a tilt from the longitudinal axis at an angle to allow both wheel assemblies 101-102 to line up concentrically and parallel (i.e., the front and back wheel assemblies 101-102 are side-by-side) when folded. The center pivot mechanism 107 can be locked to create a rigid frame structure in both the driving and folded positions through use of an embedded locking mechanism (not shown). The folded position of the scooter is described further below.

Folding of the Scooter

Figure 2A:
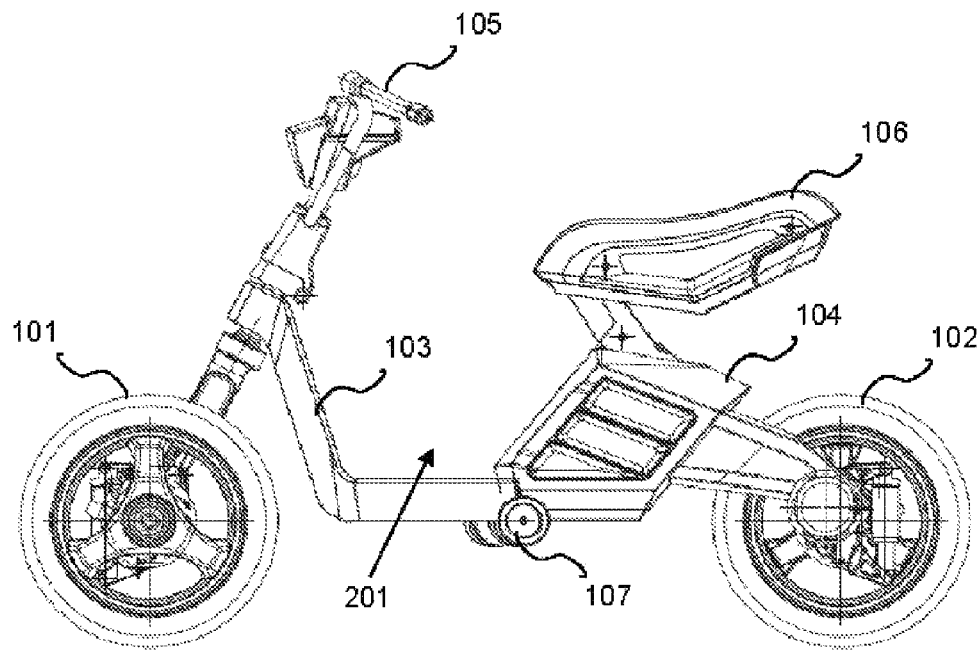
FIGS. 2A-2I illustrate the folding of the electric motor scooter from the driving position to the folded position.
Figure 2B:
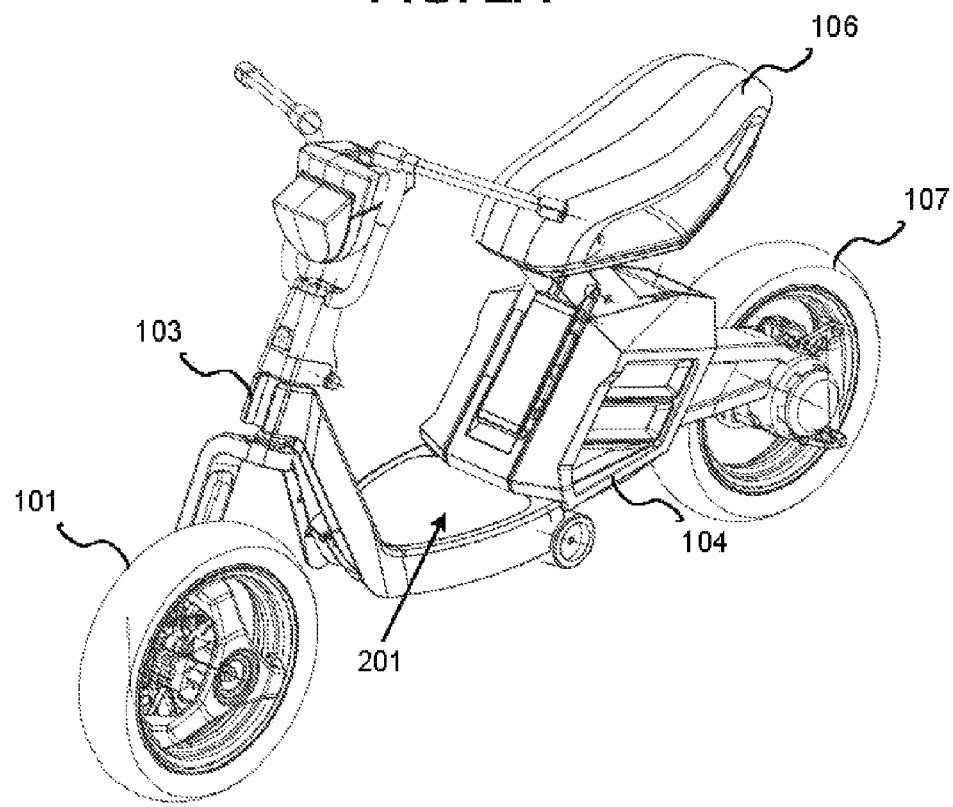
Figure 2C:
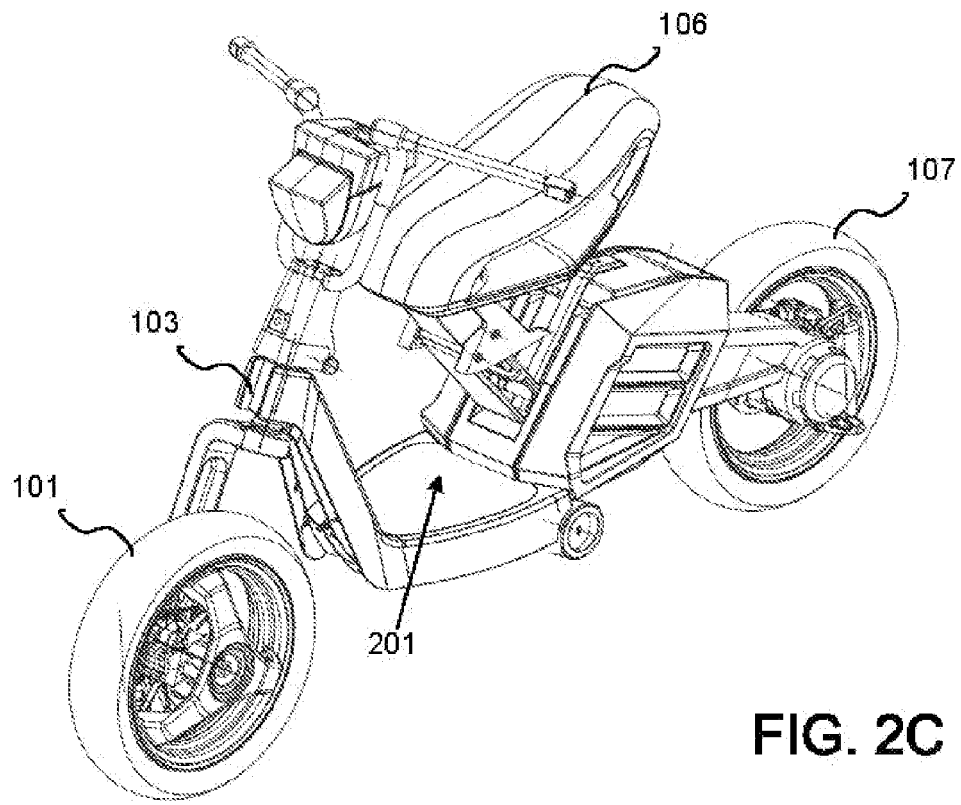
Figure 2D:
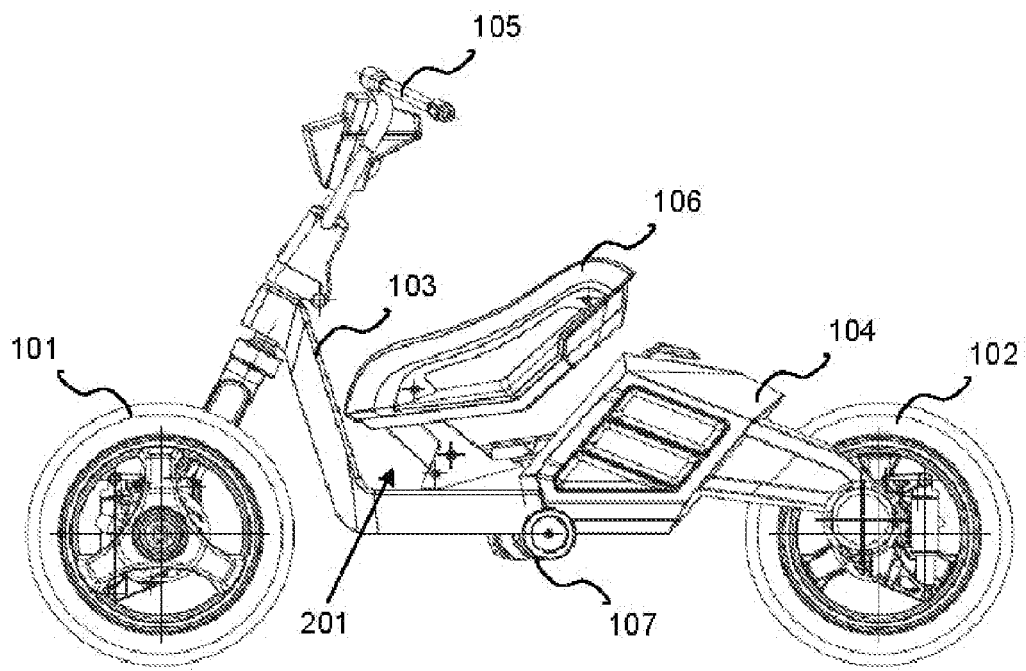
Figure 2E:
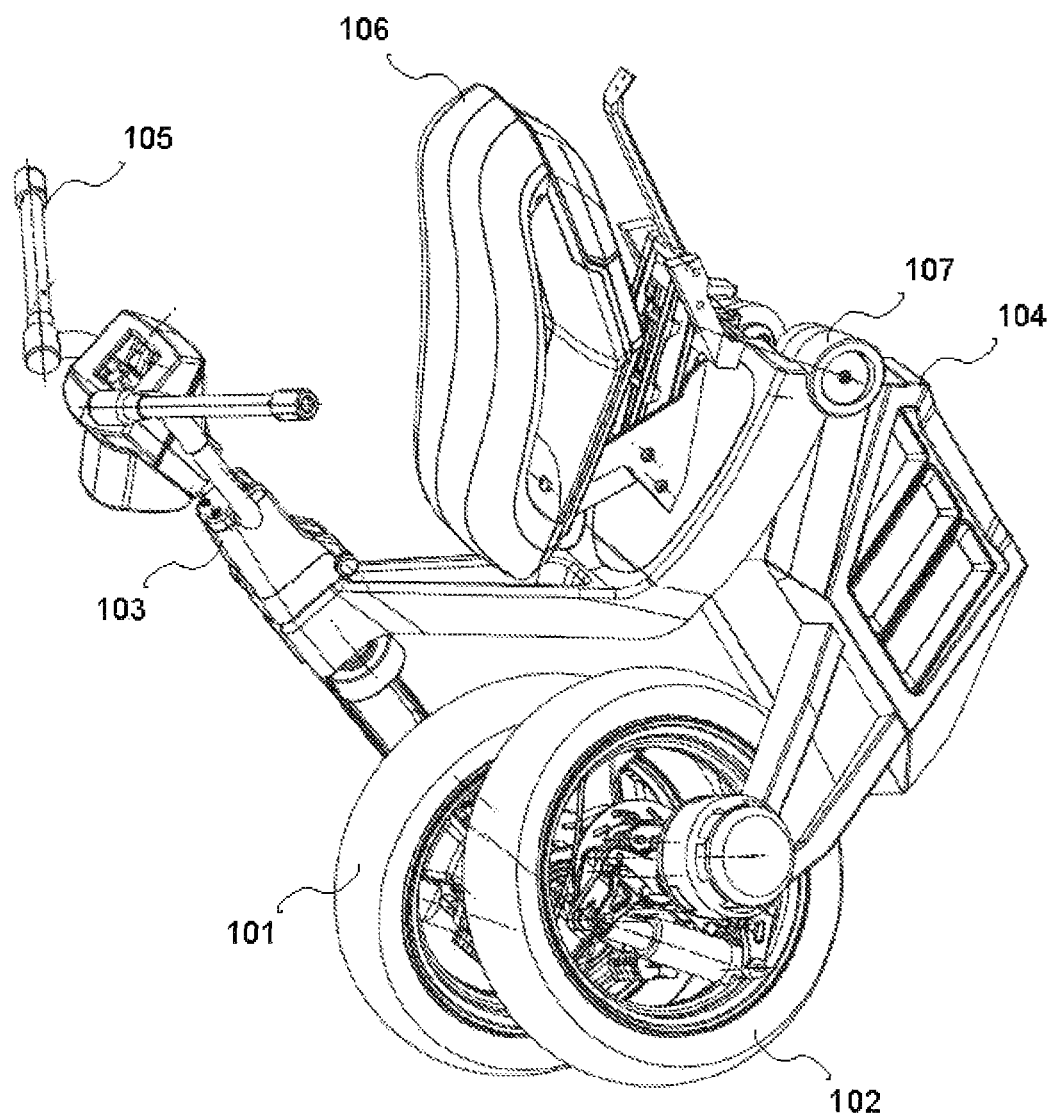
Figure 2F:
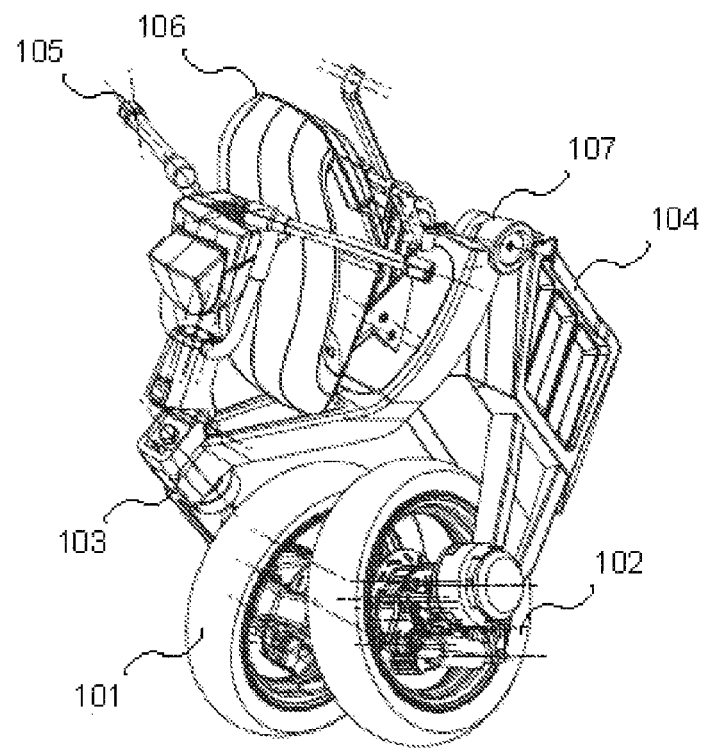
Figure 2G:
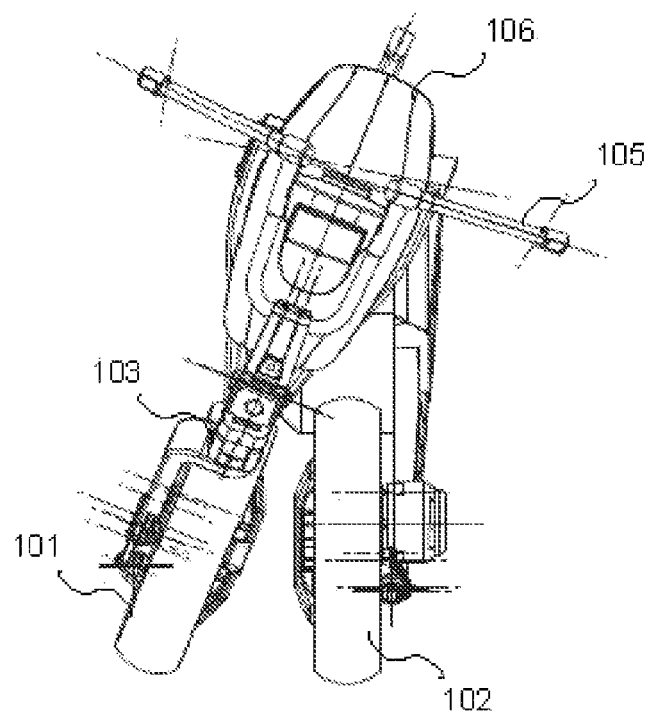
Figure 2H:
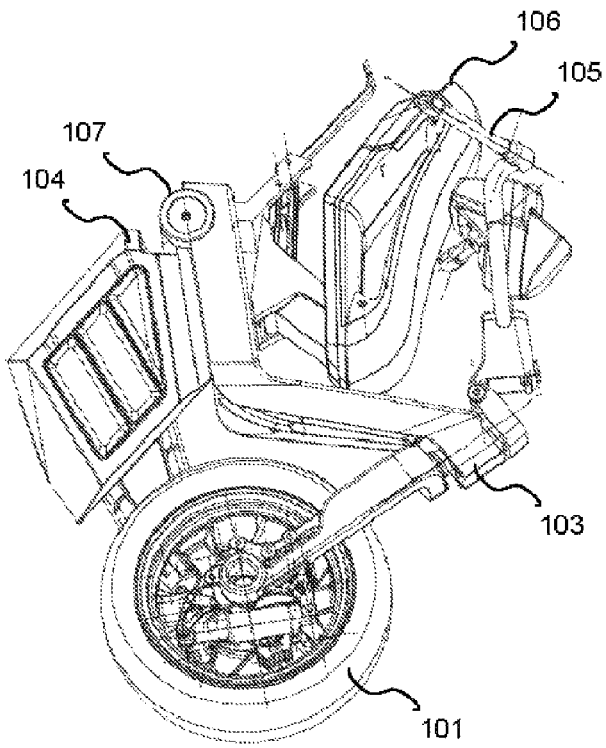
Figure 2I:
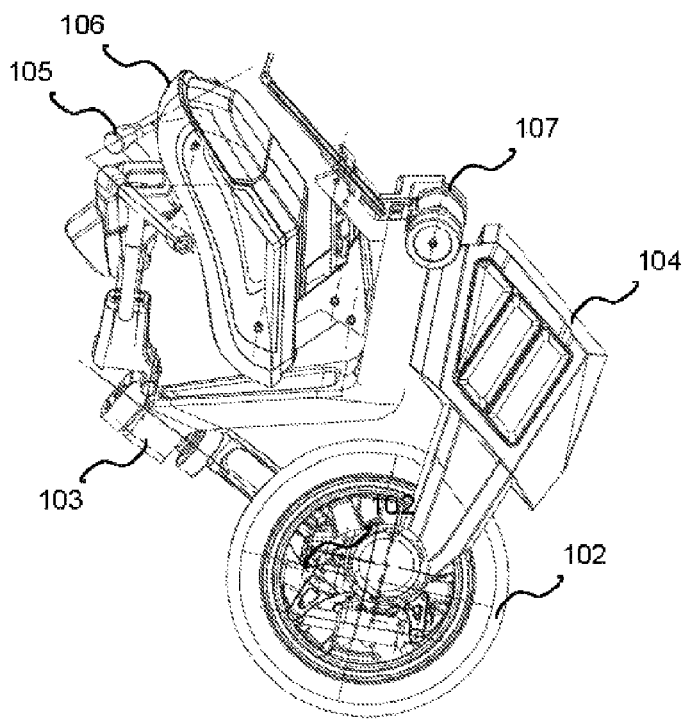

FIGS. 2A-2I illustrate the folding of the electric motor scooter from the driving position to the folded position. FIGS. 2A and 2B illustrate the scooter in the driving position; FIGS. 2C and 2D illustrate the seat assembly 106 being moved during the folding of the scooter; FIG. 2E illustrate the front 103 and back 104 frames in the folded position; FIGS. 2F and 2G illustrate the scooter with the handle bar assembly 105 being in the folded position; and FIGS. 2H and 2I illustrate side views of the scooter in the folded position. Referring to FIGS. 2A and 2B, in the driving position, both wheel assemblies 101-102 reside on the ground or surface, and the scooter is upright. To fold the scooter, first the seat assembly 106 is moved into the leg resting area 201 of the scooter, as illustrated in FIGS. 2C and 2D. Then the user holds the back frame 104 and lifts the scooter upward or away from the ground. As the user does so, the front frame 103 and back frame 104 pivots at the center pivot mechanism 107 such that the scooter folds vertically from the ground. As the front and back frames 101-102 pivot, the back wheel assembly 102 moves toward the front wheel assembly 101. The user continues to fold the scooter in this manner until the front and back wheel assemblies 101-102 are fully folded, as illustrated in FIG. 2E. In this position, the wheel assemblies 101-102 are lined up concentrically and in parallel to each other (i.e., the front and back wheel assemblies 101-102 are side-by-side), as illustrated in FIGS. 2E through 2I. Importantly, both the front and back wheel assemblies 101-102 remain on the ground as the scooter is moved from the driving position to the folded position. In one embodiment, both the front and back wheel assemblies 101-102 contain a motor. The motor in the front wheel assembly 101 is locked while the motor in the back wheel assembly 102 is engaged to assist in moving the back wheel assembly 102 toward the front wheel assembly 101 during the folding. The front and back frames 103-104 are then locked in this folded position, as illustrated in FIGS. 2F and 2G. The handle bar assembly 105 is then unlocked, folded, and locked into its folded position. The resulting shape of the folded scooter is compact with a minimal footprint, making it easy to store or transport.

The seat assembly 106 is described further below with reference to FIGS. 4A-4D. The handle bar assembly 105 is described further below with reference to FIGS. 5A-5C.

Center Pivot Mechanism

Figure 3A:
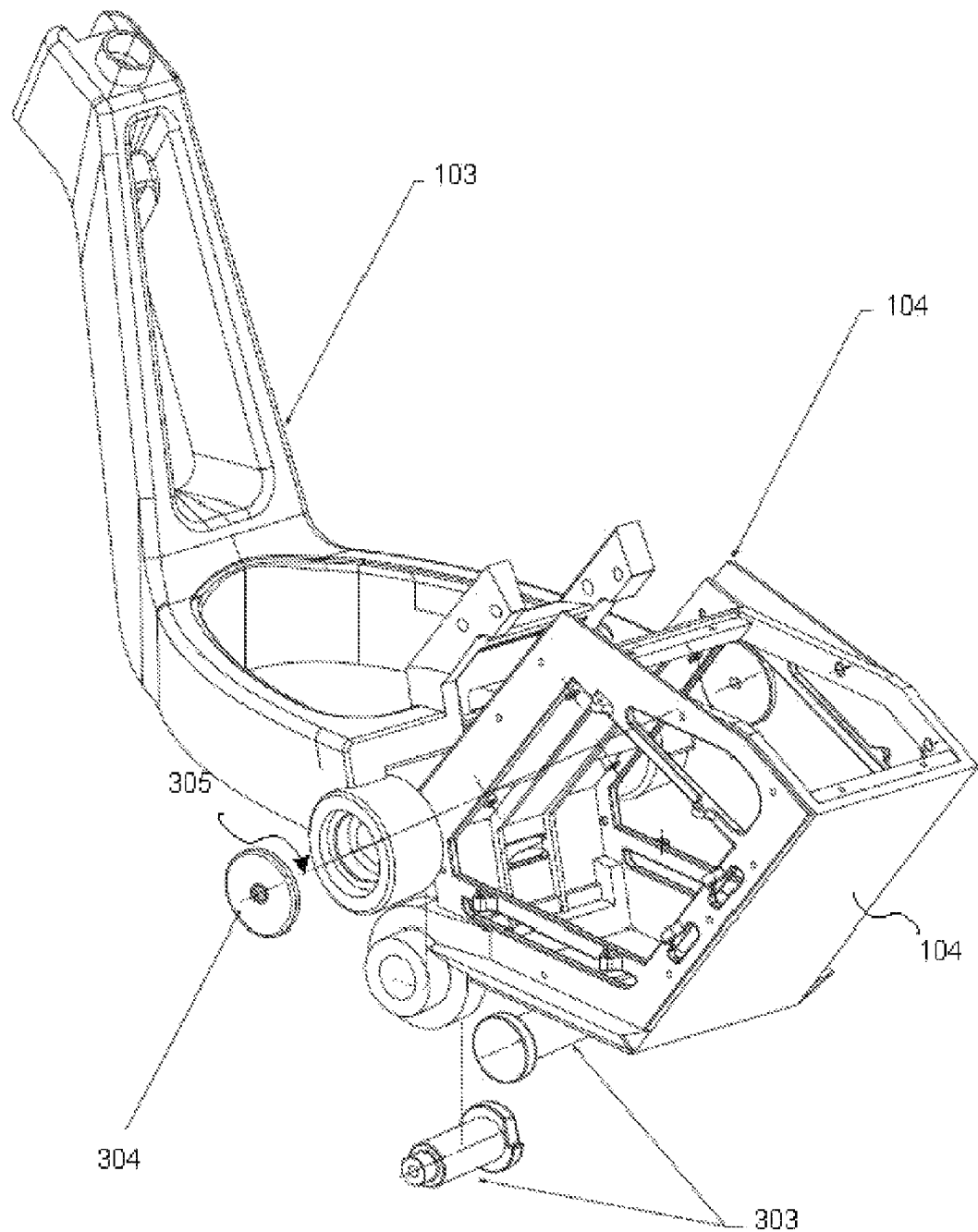
FIGS. 3A-3C illustrate in more detail the center pivot mechanism of the electric motor scooter.
Figure 3B:
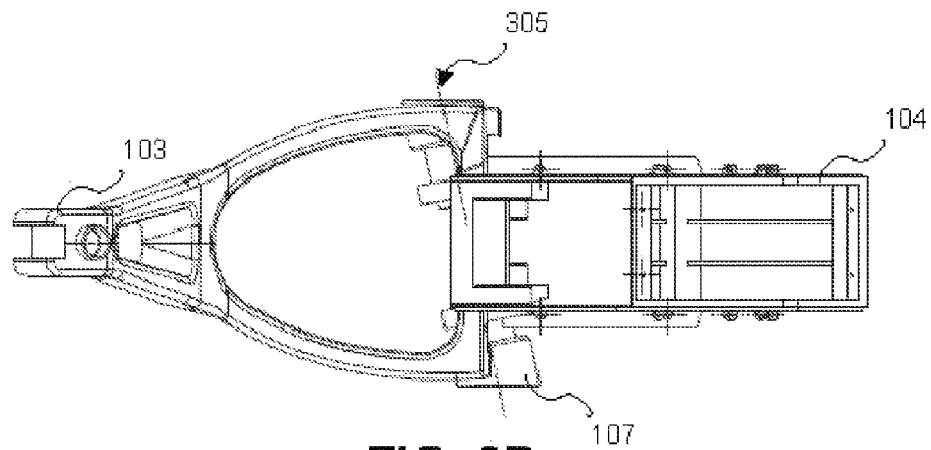
Figure 3C:
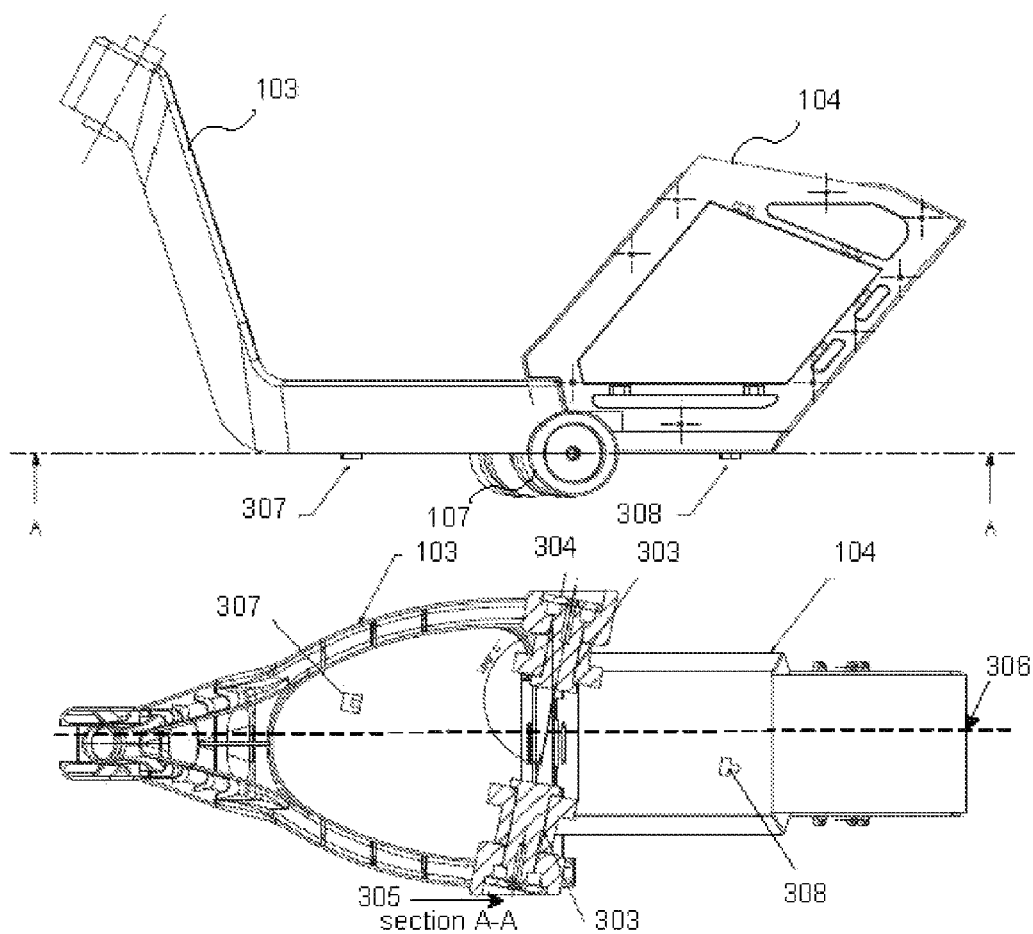

FIGS. 3A-3C illustrate in more detail the center pivot mechanism 107 of the electric motor scooter. FIG. 3A illustrates an exploded perspective view of the center pivot mechanism 107; FIG. 3B illustrates a top composite view of the center pivot mechanism 107; and FIG. 3C illustrate a sectional view of the center pivot mechanism 107. As illustrated in FIG. 3A, the center pivot mechanism 107 is comprised of two rotational shaft connectors 303, a pivot cap 304, and a folding axis 305. The two rotational shaft connectors 303 join the front and back frame along folding axis 305. The folding scooter only requires engagement of a front lock 307 and a back lock 308 in the folded position. The folding scooter does not require locks for the unfolded position as the combination of the geometric constraints created by the four-bar linkage of the seat which connects the front and back front in the unfolded position and the weight of the seat and driver prevents any folding movement. Alternatively, the pivot 303 can be a hollow shaft. As illustrated in FIGS. 3B and 3C, the folding axis 305 is not perpendicular to the scooter's longitudinal axis 306 and is tilted from the longitudinal axis 206 at an angle. Because of this, as the pivot 303 is rotated in a direction for folding the scooter, the back wheel assembly 102 is guided toward the front wheel assembly 101 at the angle (wheel assemblies not shown in FIGS. 3A-3C). This angle is set such that when the pivot 303 is fully rotated, the back wheel assembly 102 is parallel and concentric with the front wheel assembly 101. To return the scooter to the driving position, the pivot 303 is rotated around the folding axis 305 in the opposite direction.

Seat Assembly

Figure 4A:
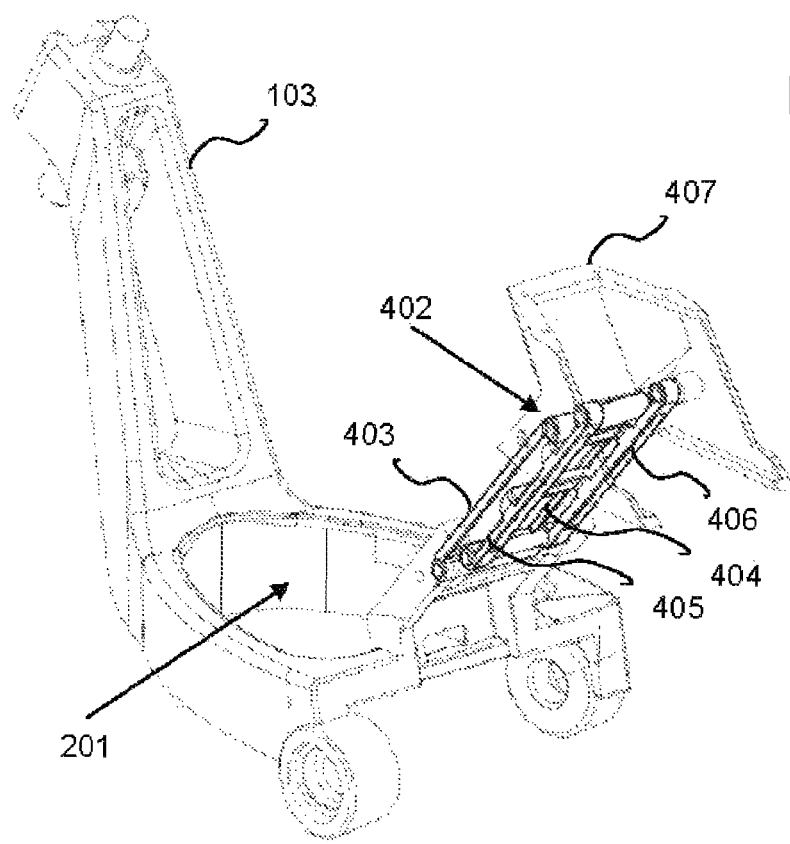
FIGS. 4A-4D illustrate in more detail the seat assembly of the electric motor scooter.
Figure 4B:
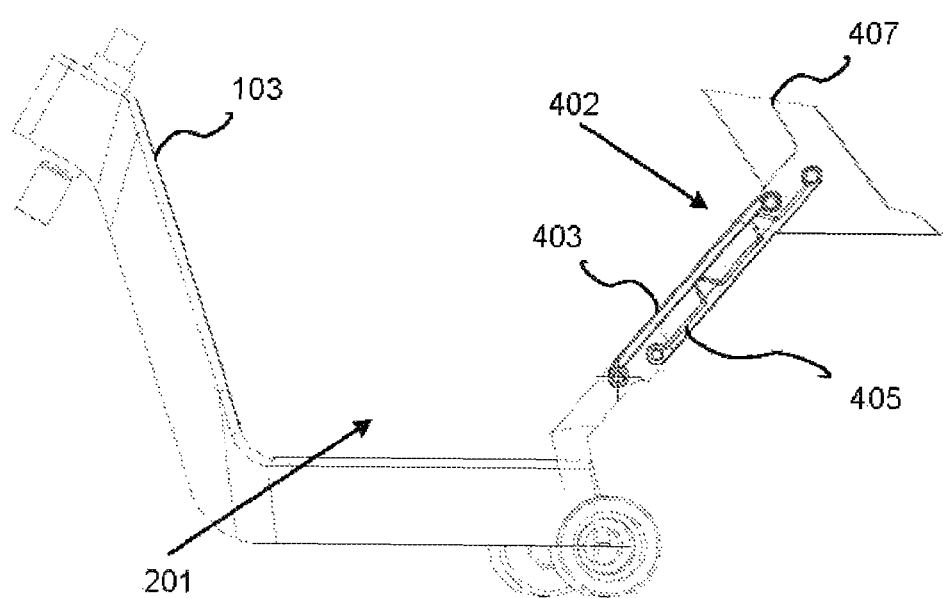

FIGS. 4A-4D illustrate in more detail the seat assembly 106 of the electric motor scooter. The seat assembly 106 includes a four-bar linkage 402 coupled to the front frame 103 at one end. The other end of the four-bar linkage 402 is coupled to a bracket 407. The bracket 407 is then coupled to a seat (not shown in FIGS. 4A-4D). The four-bar linkage 402 includes the four bars 403-406. One end of each bar 403-406 is movably coupled to the front frame 103 and the other end of each bar 403-406 is coupled to the bracket 407. FIGS. 4A-4B illustrate the positions of the four-bar linkage and the bracket 407 when the scooter is in the driving position. In the driving position, the four-bar linkage 402 is locked in place to give the overall scooter frame structural support and rigidity. Note that the four-bar linkage 402 is not coupled to the back frame 104.

Figure 4C:
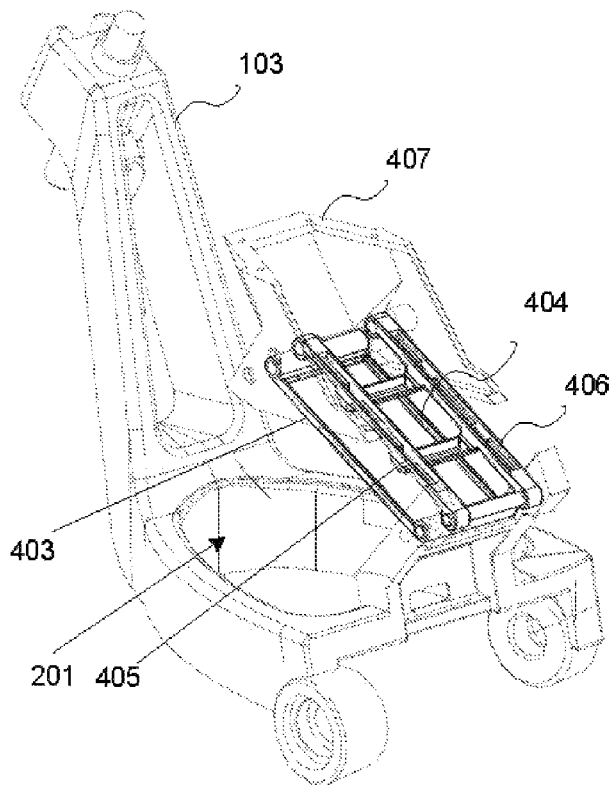
Figure 4D:
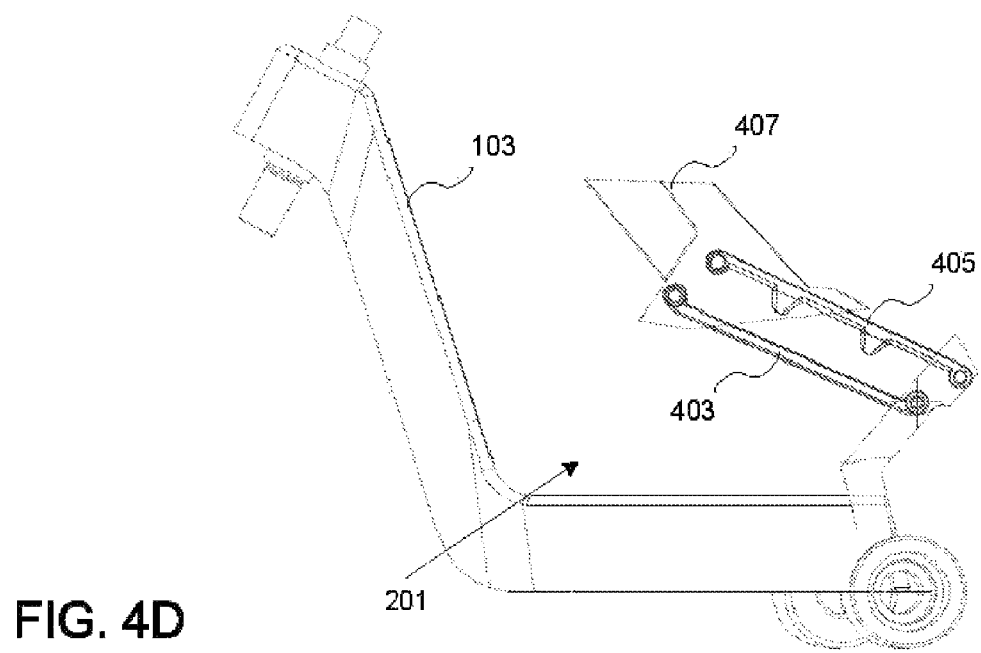

FIGS. 4C-4D illustrate the positions of the four-bar linkage 402 and the bracket 407 when the scooter is being moved into the folded position. When the scooter is being folded, the four-bar linkage 402 is unlocked and moved so that the seat is moved into the leg resting area 201. The four-bar linkage 402 is geometrically constrained to easily guide the seat from one position to the next and back. Because the four-bar linkage 402 is coupled only to the front frame 103, the angle of the seat assembly 106 need not be adjusted to accommodate the tilt angle of the center pivot mechanism 107 to facilitate the folding. Folding of the seat assembly 106 facilitates the compactness of the scooter in the folded position.

Handle Bar Assembly

Figure 5A:
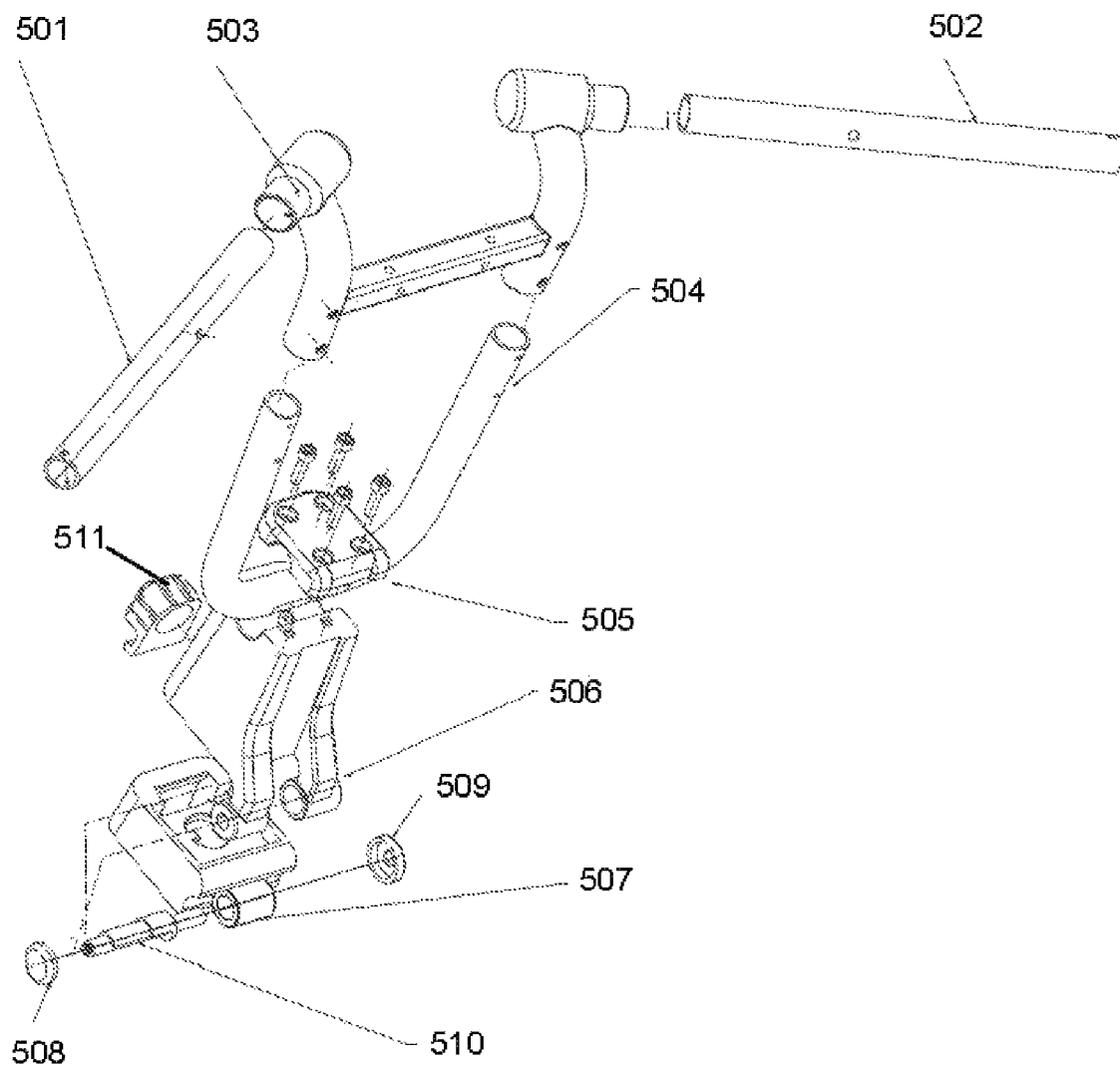
FIGS. 5A-5C illustrate in more detail the handle bar assembly of the motor scooter.
Figure 5B:
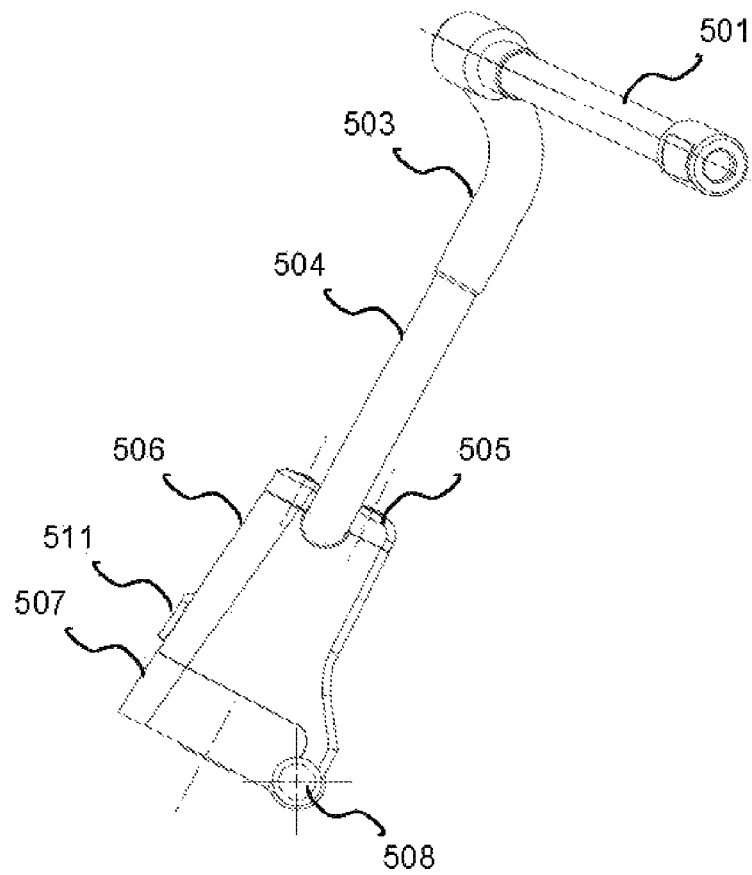
Figure 5B:
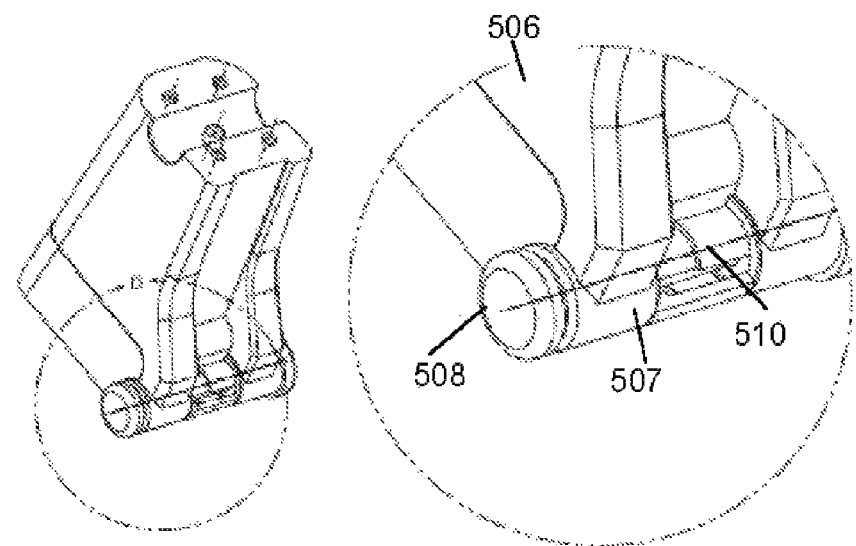
Figure 5C:
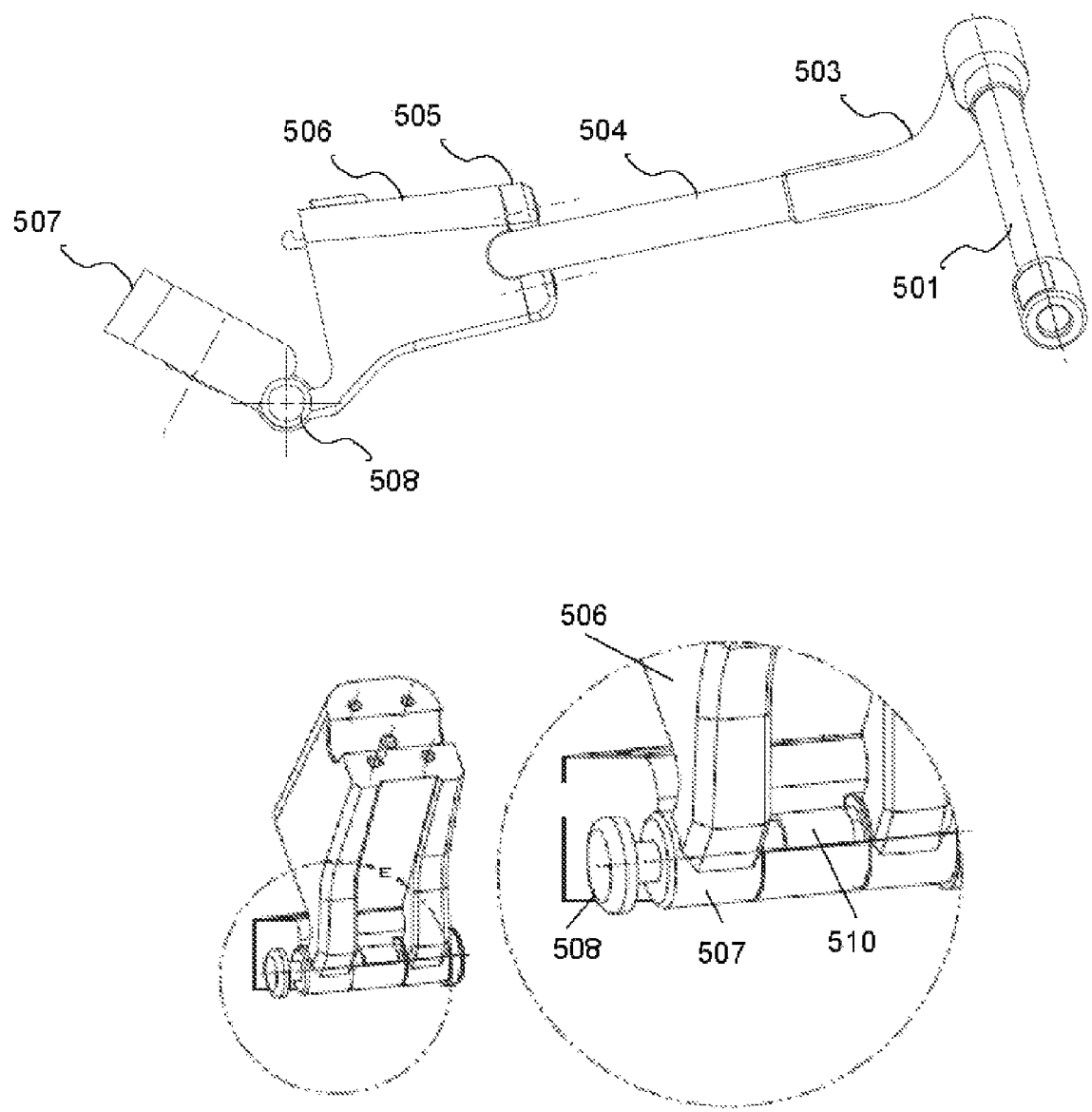

FIGS. 5A-5C illustrate in more detail the handle bar assembly 105 of the motor scooter. FIG. 5A illustrates an exploded view of the handle bar assembly 105; FIG. 5B illustrates a composite view and a detail view of the handle bar assembly 105 in the driving position; and FIG. 5C illustrates a composite view and a detail view of the handle bar assembly 105 in the folded position. The handle bar assembly 105 includes a left handle bar 501, a right handle bar 502, an upper handle pipe 503, and a bottom handle pipe 504. The right and left handle bars 501-502 are coupled to the upper handle pipe 303. The upper handle pipe 503 is coupled to the bottom handle pipe 504. The assembly 105 further includes a handle cap 505, a handle bottom 506, a handle bar base 507, handle bar locking cap 508 (located on the left side of the handle bar base 507), a right handle bar rotation axis cap 509, a handle bar rotation axis 510, and are lease button 511. The handle cap 505 couples the bottom handle pipe 504 to the handle bottom 506. The handle base rotation axis 510 and caps 508-509 couple the handle base 507 to the handle bottom 506.

As illustrated in FIG. 5B, the handle bottom 506 is locked to the handle base 507 when the scooter is in the driving position. To fold the handle bar assembly 105, the release button 511 is pressed to unlock the handle bottom 506 from the handle base 507. As illustrated in FIG. 5C, after being unlocked, the handle base 506 is rotated along the handle base rotation axis 510 toward the remainder of the scooter, i.e., inward. Folding the handle bar assembly 105 further adds to the compactness of the scooter when in the folded position. As the user rotates the handle back inward, the locking cap 508 is released, therefore locking the handlebar in the folded position. To unfold the handlebar, users will need to press locking cap 508, and then rotate the handle bar back to the driving position, locking the handle bottom 506 to the handle base 507.

Wheel Assembly

Figure 6A:
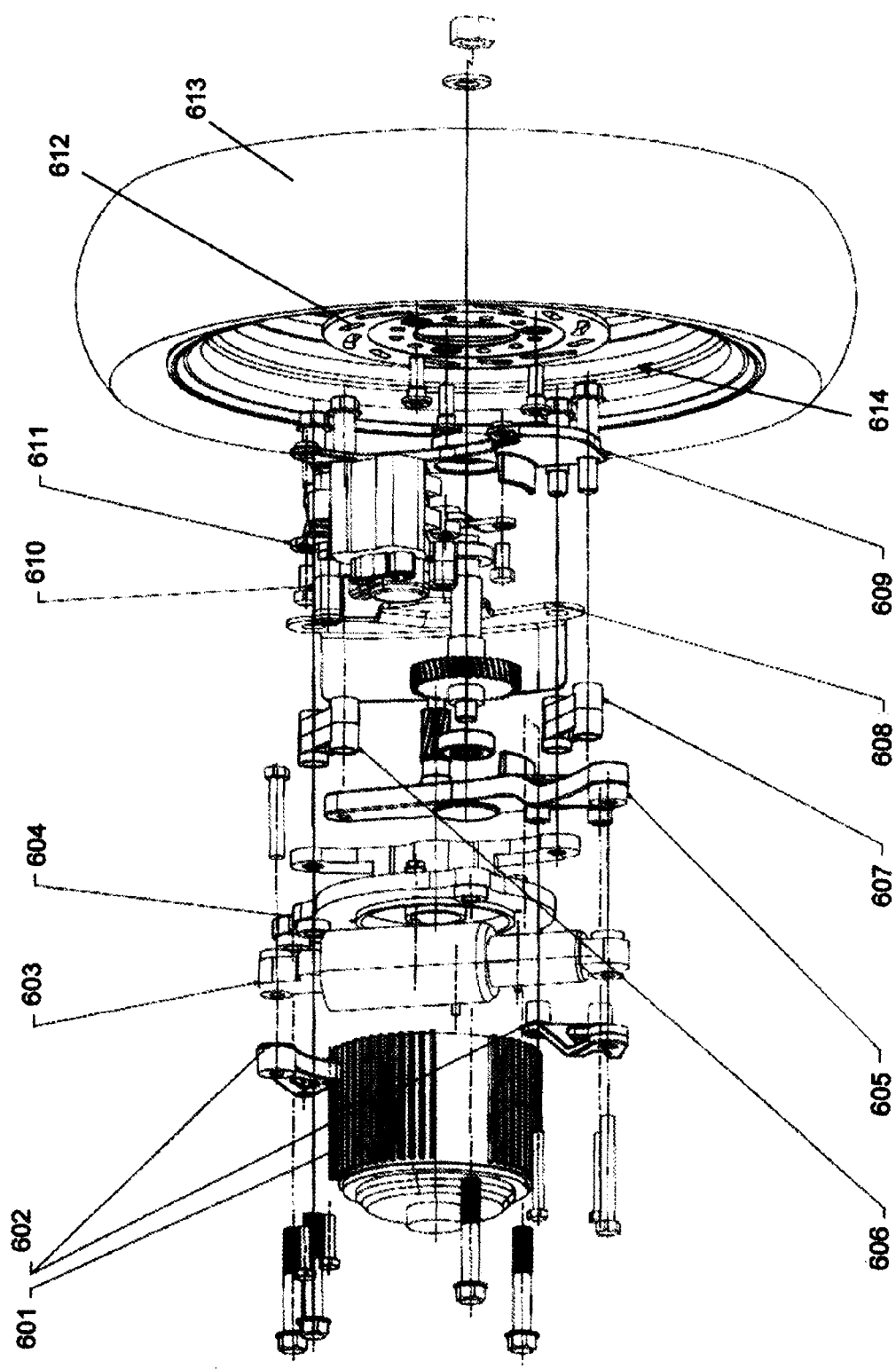
FIGS. 6A-6D illustrate in more detail the wheel assembly of the electric motor scooter.
Figure 6B:
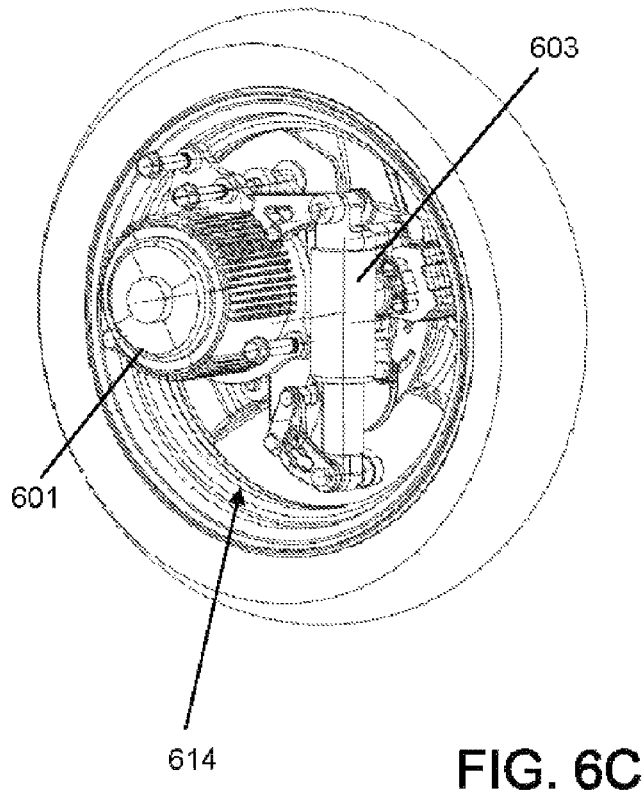
Figure 6C:
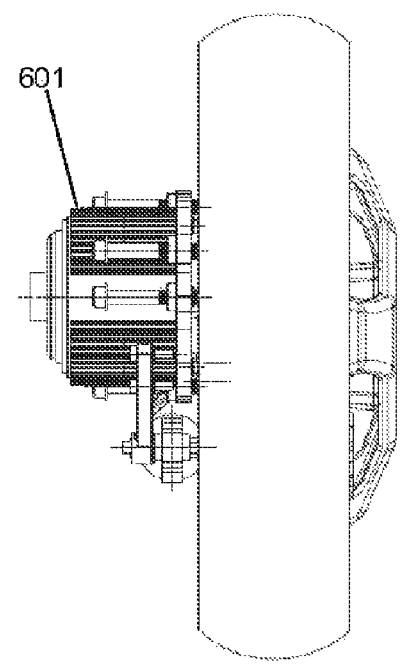
Figure 6D:
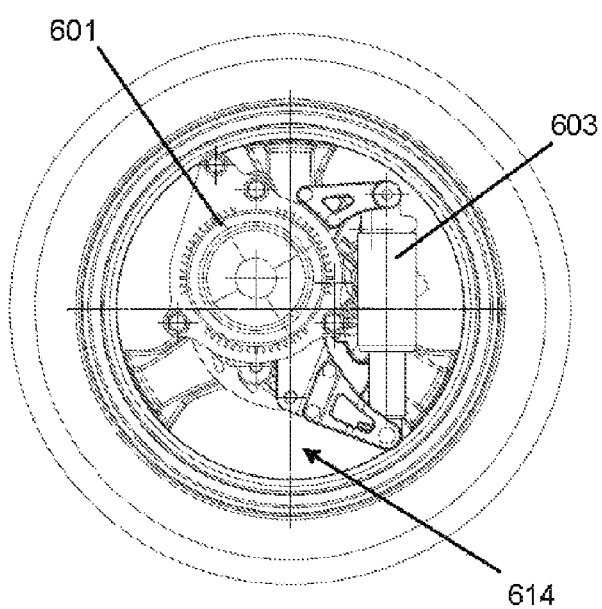

FIGS. 6A-6D illustrate in more detail the wheel assembly of the electric motor scooter. In this embodiment, the illustrated wheel assembly is used for both the front wheel assembly 101 and the back wheel assembly 102, resulting in an even weight distribution. FIG. 6A illustrates an exploded view of the wheel assembly; FIG. 6B illustrates a composite perspective view of the wheel assembly; FIG. 6C illustrates a composite side view of the wheel assembly; and FIG. 6D illustrates a composite front view of the wheel assembly. As illustrated in FIG. 6A, the wheel assembly includes a motor 601, a suspension bracket 602, a suspension 603, a motor mounting bracket 604, a lower left linkage 506, an upper linkage 606, a bottom linkage 607, an upper left linkage 608, a lower right linkage 609, a caliper 610, a disk brake bracket 611, a disk brake 612, and a tire 613, and rim 614

As can be seen in FIG. 6B, the components of the wheel assembly reside within the space of the hub of the wheel, which comprises the tire 613 and rim 614, including the suspension system. The suspension system includes the suspension 603 and a four-bar linkage with integrated transmission and with a constant effective gear radius. The four-bar linkage contains the upper linkage 606 and the bottom linkage 607 combination as a first bar, the lower left linkage 605 as a second bar, the upper left linkage 608 as a third bar, and the lower right linkage 609 as a fourth bar. This four-bar linkage ensures a constant gear ratio, and the radius of swing is equal to the effective pitch radius of the two gears. This ensures geometric control guidance of the suspension travel distance. The suspension system being within the space of the wheel hub distributes horizontal loads through the linkage rather than two fixed points as in a traditional suspension. Further, the wheel assembly layout creates a modular design and is scalable to different sized wheel designs. The design allows for the easy substitution of different components for easy customization and performance upgrades.

The four-bar linkage also reduces the unsprung mass. When the suspension system moves, such as when the scooter hits a bump or a hole in the road, the motor 601 moves with the suspension system. This reduction in the unsprung mass significantly improves the ride characteristics of the scooter, as well as being less destructive to the motor 601.

Although the wheel assembly is described here in the context of an electric motor scooter, one of ordinary skill in the art will understand that this wheel assembly can be used with wheels of other vehicle types without departing from the spirit and scope of the present invention.

Front Frame

Figure 7A:
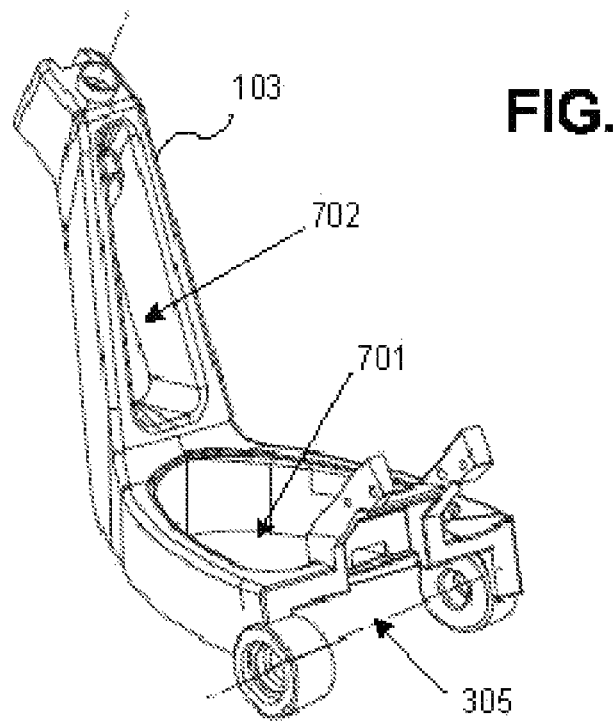
FIGS. 7A-7G illustrate in more detail the design of the front frame of the electric motor scooter.
Figure 7B:
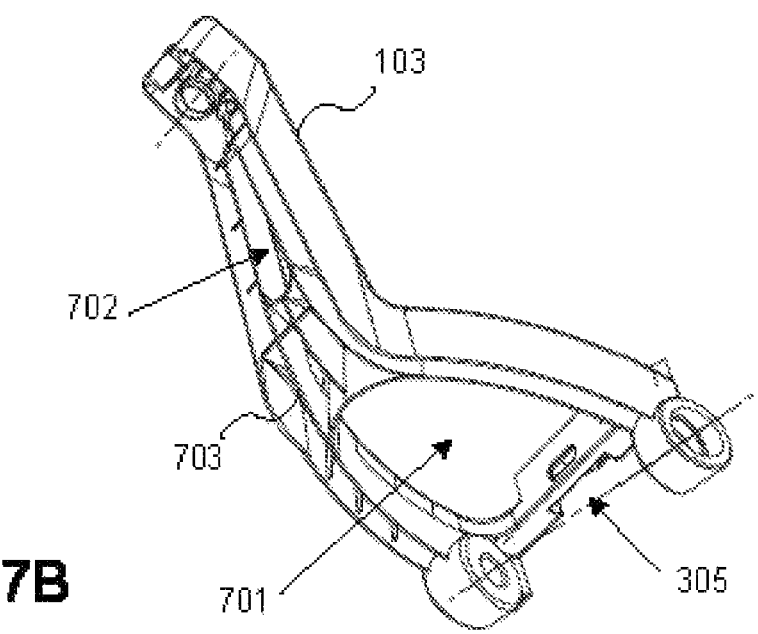
Figure 7C:
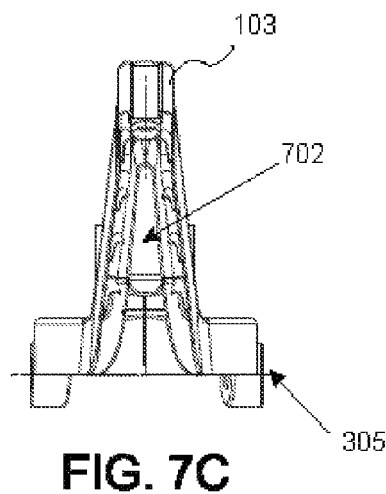
Figure 7D:
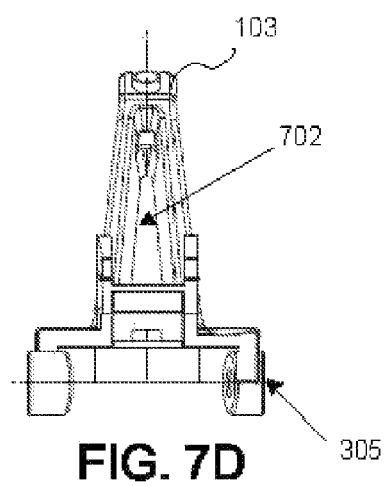
Figure 7E:
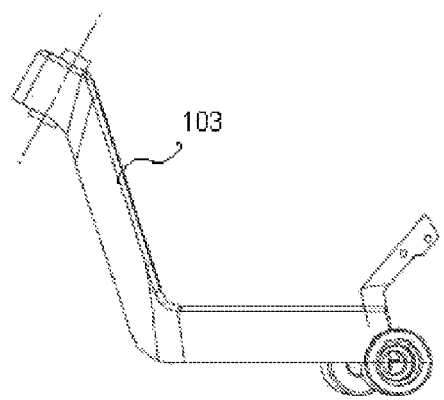
Figure 7F:
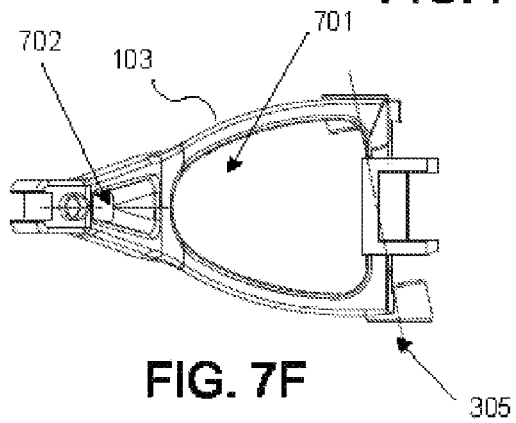
Figure 7G:
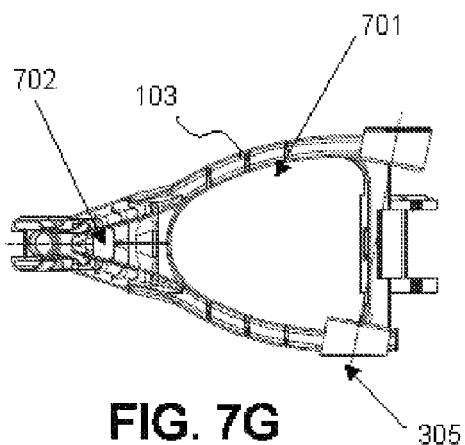

FIGS. 7A-7G illustrate in more detail the design of the front frame 103 of the electric motor scooter. FIG. 7A illustrates a top perspective view of the front frame 103; FIG. 7B illustrates a bottom perspective view of the front frame 103; FIGS. 7C-7D illustrate front and back views, respectively, of the front frame 103; FIG. 7E illustrates a side view of the front frame 103; and FIGS. 7F-7G illustrate top and bottom views, respectively, of the front frame 103. The front frame 103 is designed by constraining the overall frame volume bounded by the scooter wheel base and other key points, such as seat position, handle bar position, foot position, etc., and iterated through structural analysis (finite element analysis) by subtracting excess material. This structural logic dictated a design in a bottom up process. This differs from the traditional frame design which is normally a top-down process of fitting a structural design into a pre-determined vehicle packaging constraints. The resulting front frame design contains a first hole 702 near the location of the handle bar assembly and a second hole 701 near the leg resting area. As illustrated in FIG. 7B, the frame is composed of ribs 703. The holes 701-702 and ribs 703 lighten the weight of the frame while maintaining structural integrity and rigidity for the scooter.

Back Frame

Figure 8A:
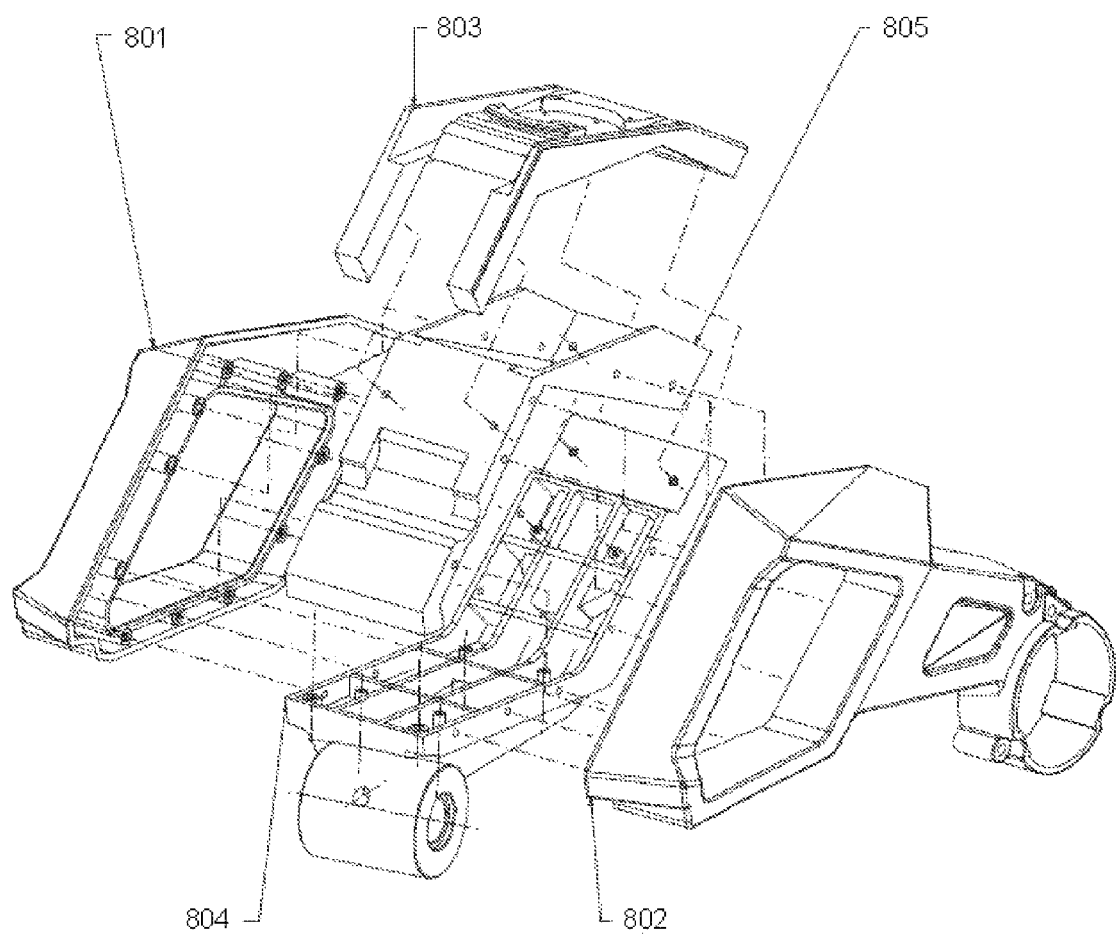
FIGS. 8A-8B illustrate in more detail the back frame of the electric motor scooter.
Figure 8B:
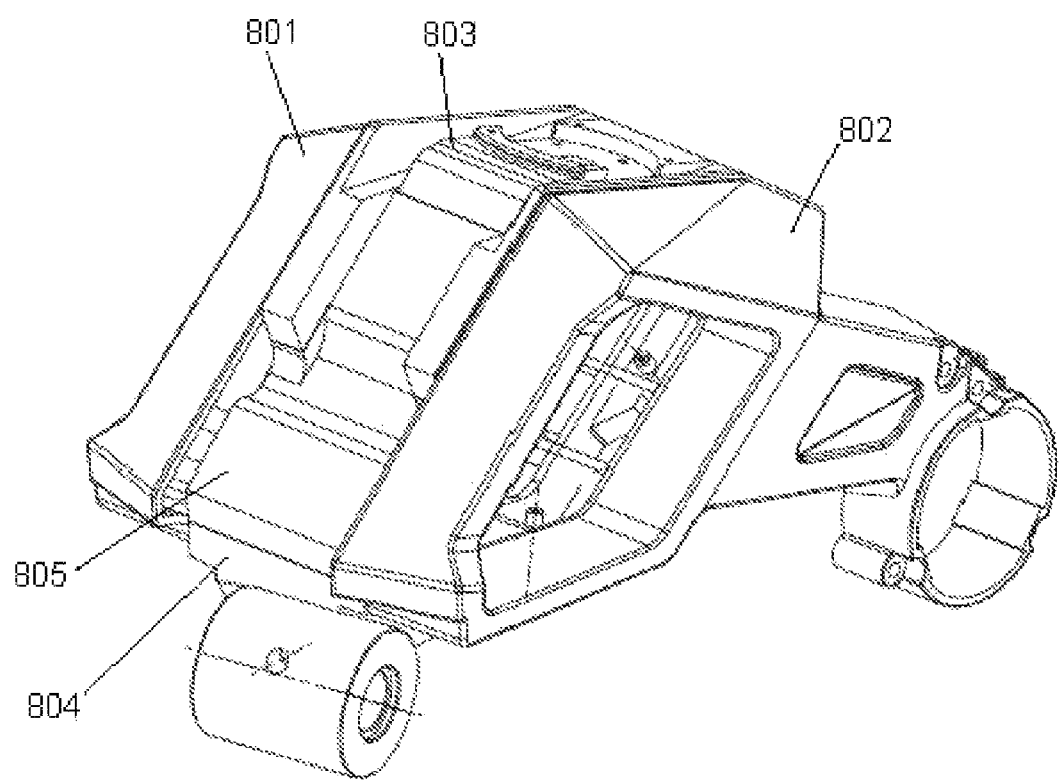

FIGS. 8A-8B illustrate in more detail the back frame 104 of the electric motor scooter. FIG. 8A illustrates an exploded view of the back frame 104; and FIG. 8B illustrates a composite view of the back frame 104. As illustrated in FIG. 8A, the back frame 104 is composed of interlocking panels or parts, which can be coupled together through the use of screws. No welding is required. The interlocking feature allows the back frame 104 to be assembled quickly and allows one or more parts to be replaced without the need to replace the entire back frame 104. The interlocking feature further provides similar structural integrity and rigidity as a welded back frame.

This interlocking back frame 104 safely holds and protects the scooter's batteries and electronics. The back frame 104 also connects to the back wheel assembly 102 and the center pivot mechanism 107. The back frame 104 is not connected to the seat assembly 106, however, groves in part 803 allow the seat assembly 106 to rest in the unfolded position. The top of part 803 contains housing for various locking mechanisms between the seat bracket 407 and back frame 104.

Alternative Seat Assembly

Figure 9C:
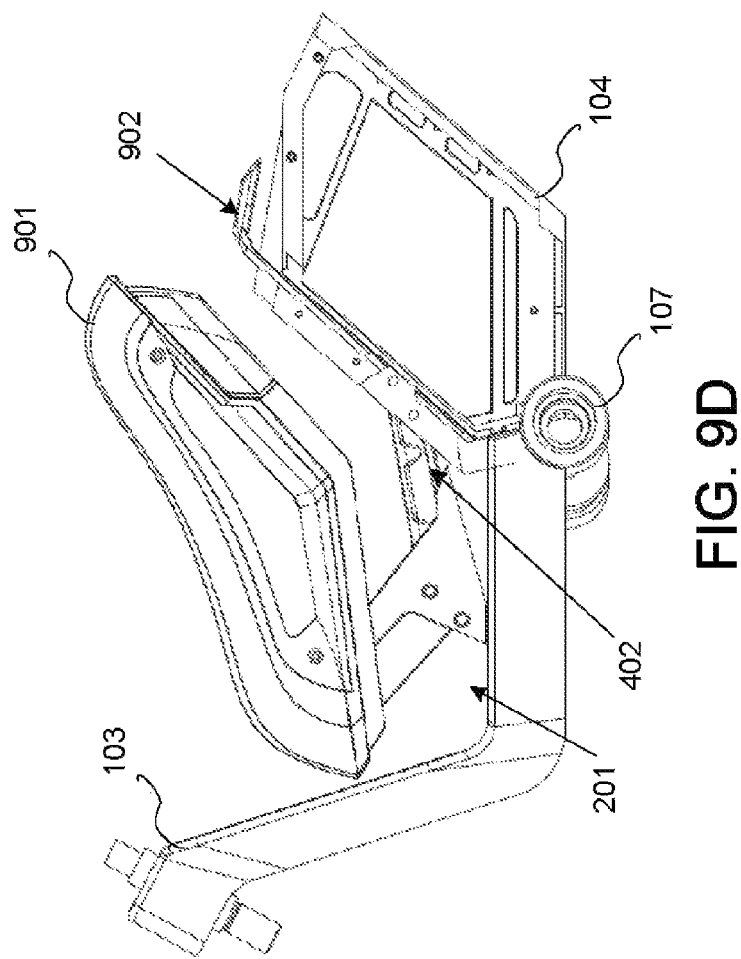
Figure 9D:
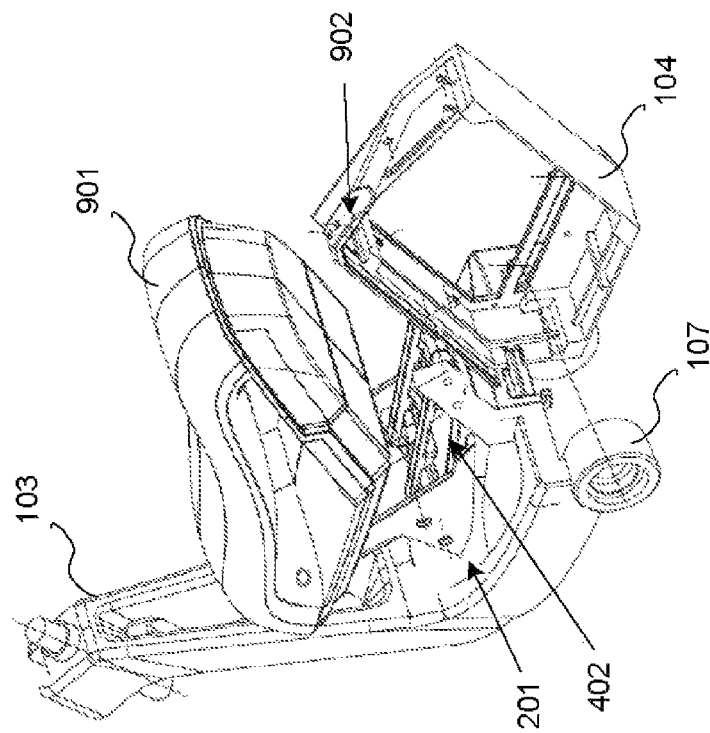
Figure 9F:
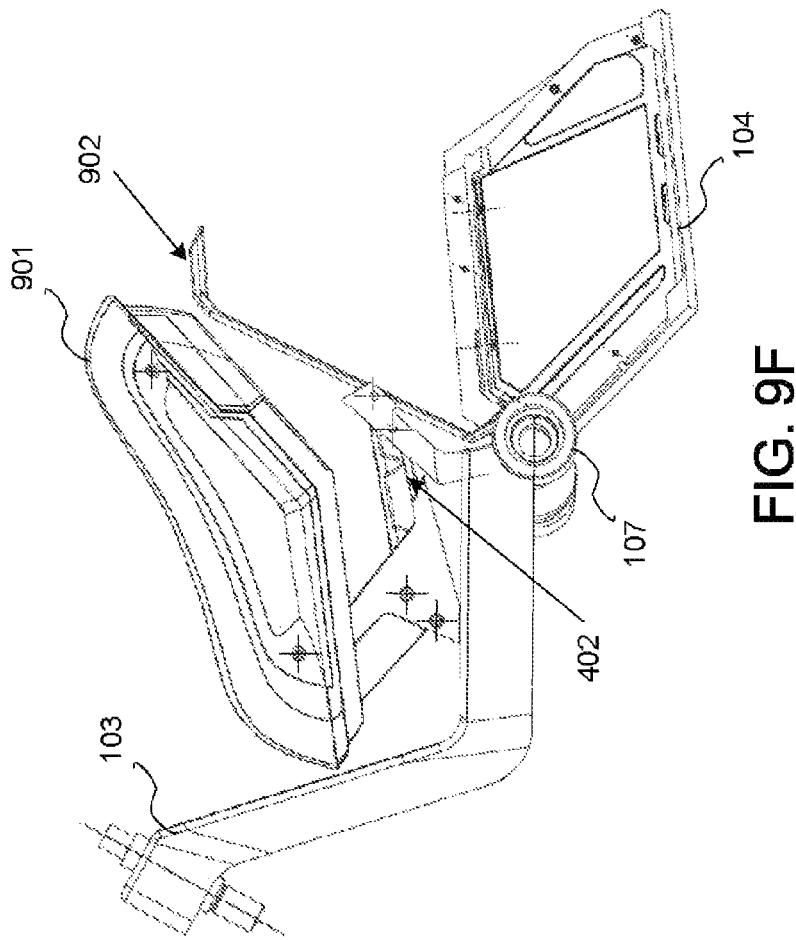
Figure 9E:
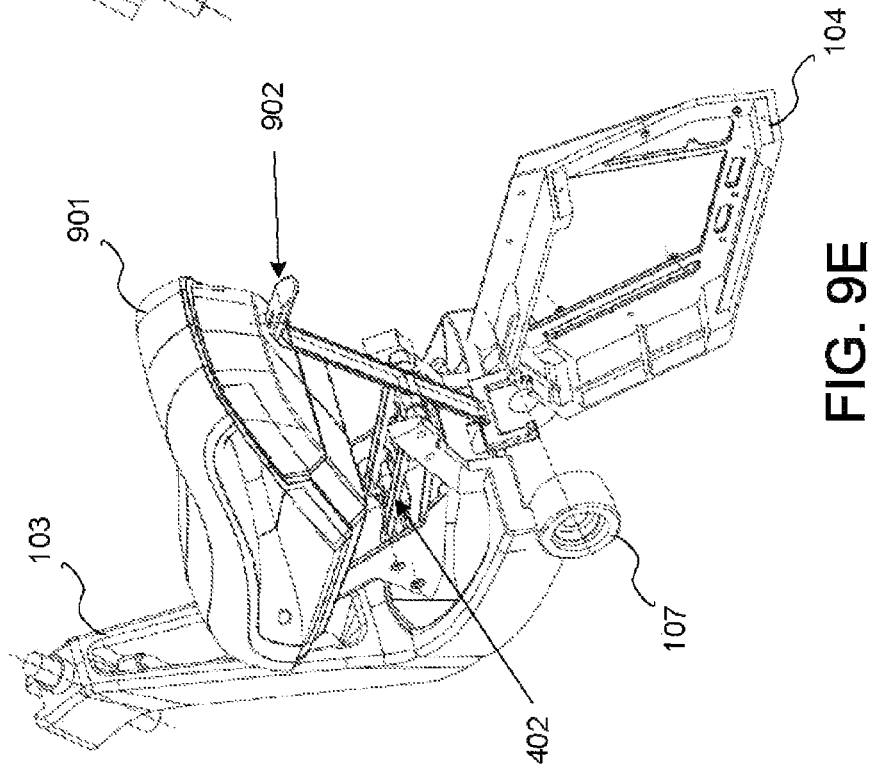
Figure 9G:
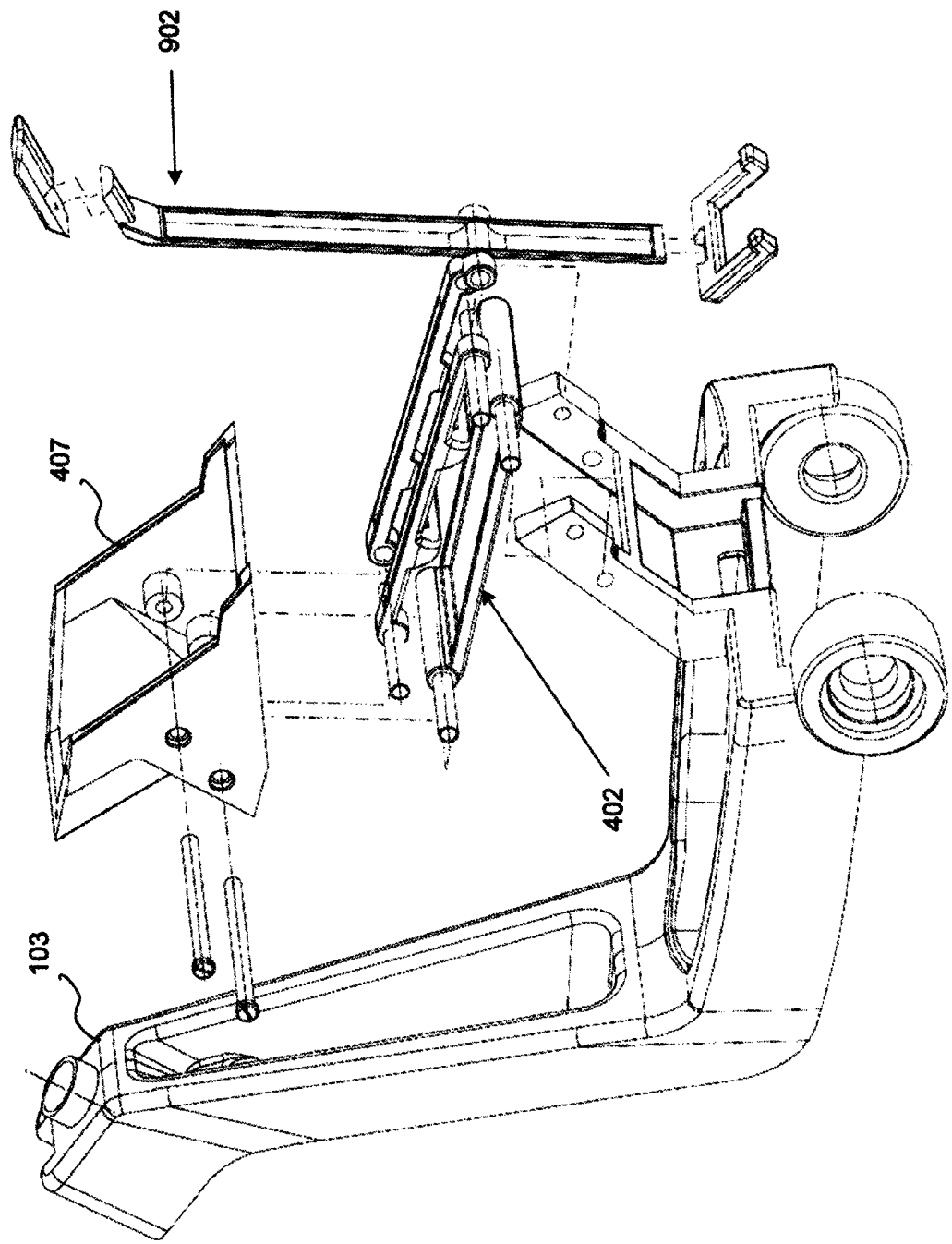

FIGS. 9A-9G illustrate an alternative seat assembly design for the electric motor scooter. FIGS. 9A and 9B illustrate a perspective view and a side view, respectively, of the seat assembly 901 in the driving position; FIGS. 9C and 9D illustrate a perspective view and a side view, respectively, of the seat assembly 901 in the folded position; FIGS. 9E and 9F illustrate a perspective view and a side view, respectively, of the seat assembly 901 with the fifth bar engaged; and FIG. 9G illustrates an exploded view of the seat assembly 901. The seat assembly 901 is coupled to the front frame 103 and includes the four-bar linkage 402. Coupled to the front frame 103 and the four-bar linkage 402 is a fifth bar 902, which is exposed when the seat assembly 901 is moved into the leg resting area 201, as illustrated in FIGS. 9C and 9D. As illustrated in FIGS. 9E and 9F, once exposed, a user can lift the fifth bar 902 and use it to move the center pivot mechanism 107 upward, hence assisting in the folding of the scooter.

Battery Case

Figure 10A:
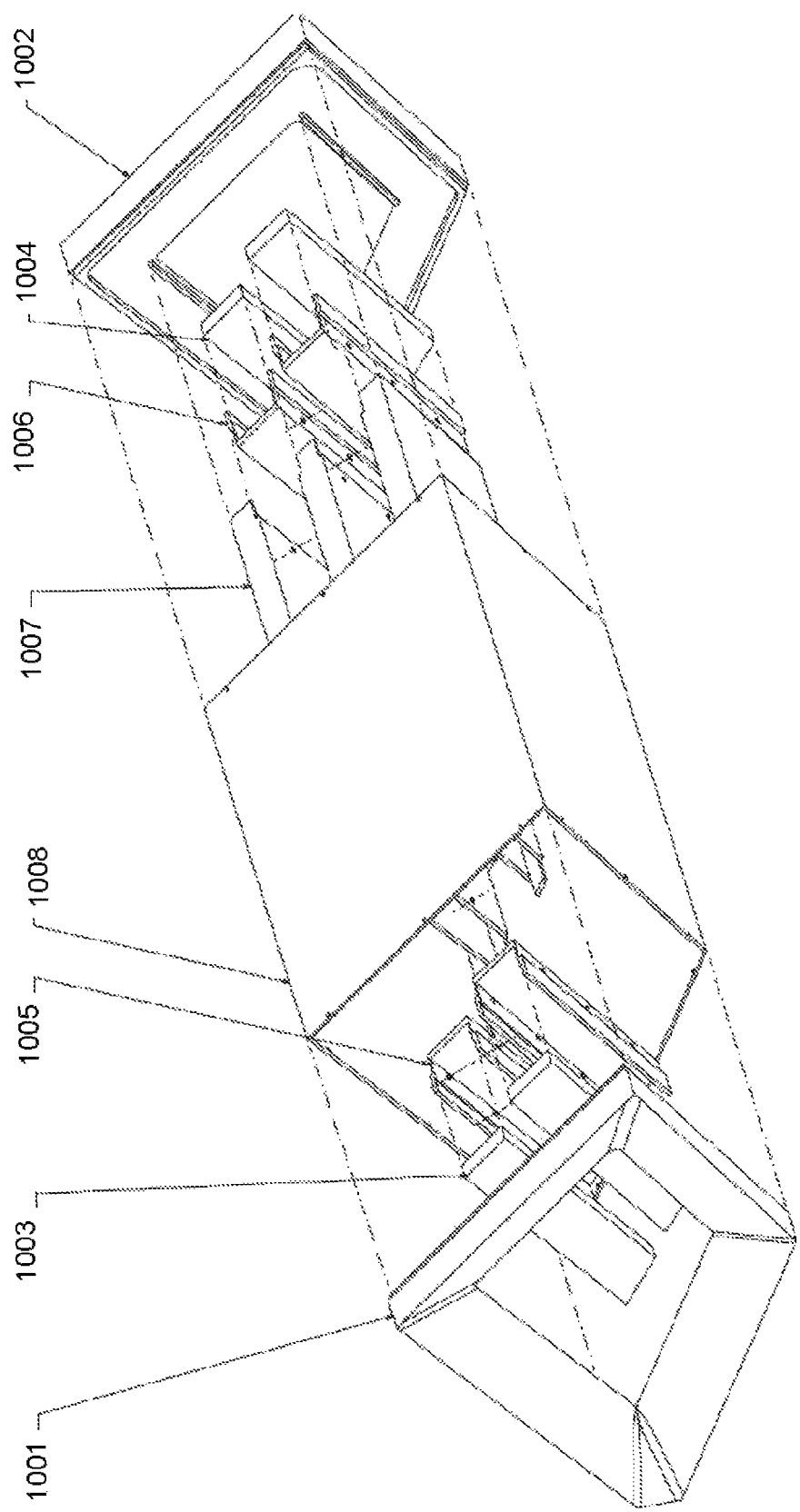
FIGS. 10A-10E illustrate in more detail the battery casing of the electric motor scooter.
Figure 10B:
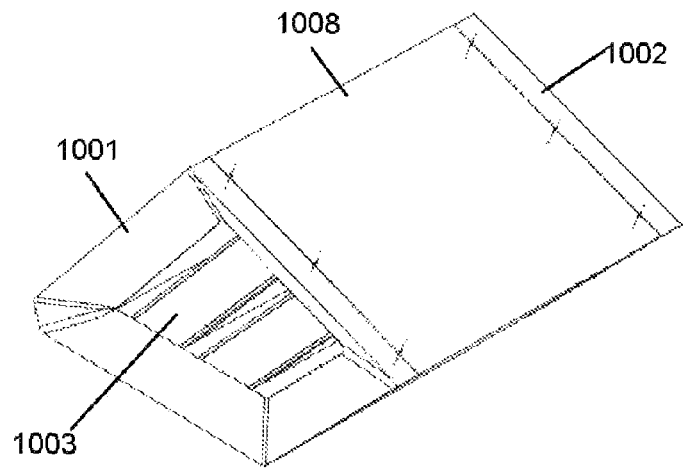
Figure 10C:
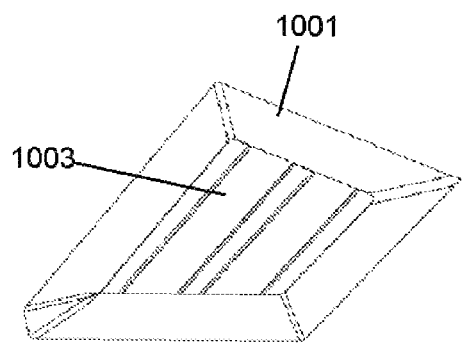
Figure 10D:
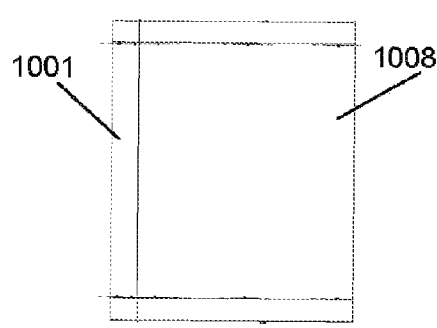
Figure 10E:
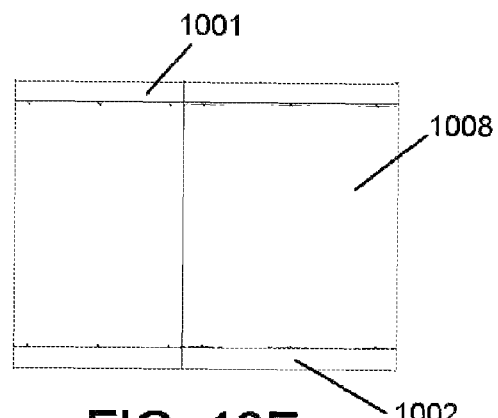

FIGS. 10A-10E illustrate in more detail the battery casing 108 of the electric motor scooter. FIG. 10A illustrates an exploded view of the battery casing 108; FIG. 10B illustrates a composite perspective view of the battery casing 108; FIG. 10C illustrates a front view of the battery casing 108; FIG. 10D illustrates a side view of the battery casing 108; and FIG. 10E illustrates a top view of the battery casing 108. The battery casing 108 includes a right side panel 1001, a left side panel 1002, a right light emitting diodes (LED) panel 1003, a left LED panel 1004, a right structure 1005 to support the right LED panel 1003, a left structure 1006 to support the left LED panel 1006, a main structure for the battery packs (not shown) for powering the motors in the wheel assemblies, and a body 1008 within which components 1003-1007 and the battery packs reside. The battery casing 108, when inserted into the back frame 104, provides additional structural support for the back frame 104, as well as protection for the batteries. The battery casing 108 is composed of aluminum and can be easily replaced.

In one embodiment, the LEDs on the LED panels 1003-1004 provide an ambient battery display. The color of the LEDs, as well as their pattern, can be used to indicate battery charge levels, progress during charging, rate of charge use, etc. For example, the color of the LEDs can range from green (for 'full') to red (for 'empty') with a color gradient in between to indicate charge level. The LEDs will flash or "pulse" according to current being drawn, and as more current is drawn, the rate increases. The LEDs thus provide a programmable means to provide information deemed to be helpful to the user of the scooter.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

We claim:

1. A two-wheeled electric motor scooter comprising:
a front frame;
a front wheel assembly coupled to the front frame;
a back frame;
a back wheel assembly coupled to the back frame; and
a center pivot mechanism coupled to the front frame and the back frame, the center pivot mechanism having a pivot axis which intersects but is not perpendicular to a vertical plane which includes the longitudinal center line of the motor scooter and bisects the motor scooter,
the center pivot mechanism permitting folding of the electric motor scooter and the pivot axis having an angle relative to the vertical plane such that when the motor scooter is folded, the center pivot mechanism moves upwards relative to a surface upon which the scooter is standing and the front wheel assembly and the back wheel assembly move relative to each other on the surface until the wheel assembles are standing side by side on the surface.

2. The scooter of claim 1, wherein when the scooter is folded, moving the center pivot mechanism downward relative to the surface upon which the wheel assemblies are standing side by side unfolds the wheel assemblies to a driving position.

3. The scooter of claim 1 further comprising:
a seat assembly which is movably coupled to the front frame at a point near the center pivot mechanism and moves away from the center pivot mechanism when the scooter is folded.

4. The scooter of claim 3 wherein the seat assembly comprises:
a seat; and
a four bar linkage, one end of each bar of the four bar linkage being coupled to the seat and an opposite end of each bar of the four bar linkage being moveably coupled to the front frame,
whereby the movable coupling renders the seat assembly movable.

5. The scooter of claim 4, wherein the seat assembly further comprises a fifth bar coupled to the front frame at the end near the center pivot mechanism and moving the seat assembly allows the fifth bar to be employed in folding the scooter.

6. The scooter of claim 1, further comprising a handle bar assembly coupled to the front frame, the handle bar assembly comprising:
a handle bottom coupled at one end to a set of handle bars;
a handle bar base coupled to another end of the handle bottom at a handle base rotation axis;
a release button coupled to the handle bar bottom, wherein when the release button is engaged, the handle bar bottom is unlocked and free to rotate around the handle base rotation axis toward the front frame; and
a locking cap coupled to the handle bar base that locks and releases the handle bar assembly from the unfolded position to folded position.

7. The scooter of claim 1 wherein:
the scooter is electrically powered and the back frame further comprises a battery casing for an electric battery, the battery casing being located between the center pivot mechanism and the rear wheel assembly.

8. The scooter of claim 7, wherein the back frame comprises:
a plurality of interlocking panels, wherein the panels are coupled without welds.

9. The scooter of claim 7, wherein the battery casing further comprises a programmable ambient display for providing information to a user of the scooter.

10. The scooter of claim 9, further comprising batteries residing within the battery casing.

11. The scooter of claim 1, wherein:
the pivot axis is included in a plane which is perpendicular to the vertical plane.

12. The scooter of claim 1 wherein:
the scooter is folded by rolling a wheel assembly on the surface until the wheel assemblies are standing substantially side by side.

13. The scooter of claim 12 wherein:
the scooter is powered, and the scooter's power is used to roll the wheel assembly.

14. The scooter set forth in claim 3 wherein:
the scooter is electrically powered and the back frame further comprises a battery casing for an electric battery, the battery casing being located between the center pivot mechanism and the rear wheel assembly; and
when the scooter is unfolded, the seat assembly is over the battery casing.

* * * * *